US006853629B2

(12) United States Patent
Alamouti et al.

(10) Patent No.: US 6,853,629 B2
(45) Date of Patent: Feb. 8, 2005

(54) METHOD FOR FREQUENCY DIVISION DUPLEX COMMUNICATIONS

(75) Inventors: Siavash Alamouti, Kirkland, WA (US); Eduardo F. Casas, Vancouver (CA); Michael Hirano, Redmond, WA (US); Elliott Hoole, Redmond, WA (US); Mary Jesse, Issaquah, WA (US); David G. Michelson, North Vancouver (CA); Patrick Poon, Redmond, WA (US); Gregory J. Veintimilla, Redmond, WA (US); Hongliang Zhang, Redmond, WA (US)

(73) Assignee: Cingular Wireless II, LLC, Redmond, WA (US)

( * ) Notice: Subject to any disclaimer, the term of this patent is extended or adjusted under 35 U.S.C. 154(b) by 72 days.

(21) Appl. No.: 10/383,976

(22) Filed: Mar. 7, 2003

(65) Prior Publication Data

US 2003/0156570 A1 Aug. 21, 2003

Related U.S. Application Data

(63) Continuation of application No. 09/294,174, filed on Apr. 19, 1999, now Pat. No. 6,560,209, which is a continuation of application No. 08/796,584, filed on Feb. 6, 1997.

(51) Int. Cl.$^7$ .............................................. H04Q 7/00
(52) U.S. Cl. ...................... 370/330; 370/203; 370/281; 370/206; 370/329; 370/336; 370/337; 370/343; 370/344; 370/321; 375/267; 375/347; 375/299
(58) Field of Search ................................ 370/330, 203, 370/281, 206, 329, 336, 337, 321, 343, 344, 208; 375/267, 347

(56) References Cited

U.S. PATENT DOCUMENTS 3,522,540 A     8/1970   Lee
3,633,107 A     1/1972   Brady
3,641,463 A     2/1972   Perks
3,745,464 A     7/1973   Lee
3,971,988 A     7/1976   Denenberg
4,249,181 A     2/1981   Lee
4,381,562 A  *  4/1983   Acampora ................... 370/323
4,383,332 A  *  5/1983   Glance et al. ........... 455/562.1
4,412,350 A    10/1983   Miedema
4,488,445 A    12/1984   Aske
4,495,648 A     1/1985   Giger
4,510,595 A     4/1985   Glance et al.
4,644,562 A     2/1987   Kavehrad
4,723,321 A     2/1988   Saleh
4,726,040 A     2/1988   Acampora (List continued on next page.)

FOREIGN PATENT DOCUMENTS

| CA | 2278852    | 8/1998 |
| EP | 0 490 509 B1 | 6/1992 |
| EP | 0 582 537 A3 | 2/1994 |

(List continued on next page.)

OTHER PUBLICATIONS

U.S. Appl. No. 10/435,304, Alamouti et al., filed May 8, 2003.

(List continued on next page.)

*Primary Examiner*—Marceau Milord
(74) *Attorney, Agent, or Firm*—Perkins Coie LLP

(57) ABSTRACT

The high quality PCS communications are enabled in environments where adjacent PCS service bands operate with out-of-band harmonics that would otherwise interfere with the system's operation. The highly bandwidth-efficient communications method combines a form of time division duplex (TDD), frequency division duplex (FDD), time division multiple access (TDMA), orthogonal frequency division multiplexing (OFDM), spatial diversity, and polarization diversity in various unique combinations. The method provides excellent fade resistance. The method enables changing a user's available bandwidth on demand by assigning additional TDMA slots during the user's session.

6 Claims, 15 Drawing Sheets

U.S. PATENT DOCUMENTS

| | | | |
|---|---|---|---|
| 4,789,983 A | 12/1988 | Acampora et al. | |
| 4,807,253 A | 2/1989 | Hagenauer et al. | |
| 4,827,499 A | 5/1989 | Warty et al. | |
| 4,835,517 A | 5/1989 | van der Gracht et al. | |
| 4,914,676 A | 4/1990 | Iwamatsu et al. | |
| 5,029,185 A | 7/1991 | Wei | |
| 5,048,057 A | 9/1991 | Saleh et al. | |
| 5,054,035 A | 10/1991 | Tarallo et al. | |
| 5,056,112 A | 10/1991 | Wei | |
| 5,084,869 A | 1/1992 | Russell | |
| 5,088,113 A | 2/1992 | Wei | |
| 5,136,612 A | 8/1992 | Bi | |
| 5,177,765 A | 1/1993 | Holland et al. | |
| 5,226,071 A | 7/1993 | Bollinger et al. | |
| 5,260,967 A | 11/1993 | Schilling | |
| 5,260,968 A | 11/1993 | Gardner et al. | |
| 5,274,384 A | 12/1993 | Hussain et al. | |
| 5,278,892 A | 1/1994 | Bolliger et al. | |
| 5,289,464 A | 2/1994 | Wang | |
| 5,291,475 A | 3/1994 | Bruckert | |
| 5,295,138 A | 3/1994 | Greenberg et al. | |
| 5,295,152 A | 3/1994 | Gudmundson et al. | |
| 5,302,914 A | 4/1994 | Arntz et al. | |
| 5,305,308 A | 4/1994 | English et al. | |
| 5,305,353 A | 4/1994 | Weerackody | |
| 5,319,634 A | 6/1994 | Bartholomew et al. | |
| 5,361,397 A | 11/1994 | Wright | |
| 5,363,375 A | 11/1994 | Chuang et al. | |
| 5,367,539 A | 11/1994 | Copley | |
| 5,394,435 A | 2/1995 | Weerackody | |
| 5,400,322 A | 3/1995 | Hunt et al. | |
| 5,410,538 A | 4/1995 | Roche et al. | |
| 5,410,740 A | 4/1995 | Hagstrom | |
| 5,414,699 A | 5/1995 | Lee | |
| 5,438,329 A | 8/1995 | Gastouniotis et al. | |
| 5,457,712 A | 10/1995 | Weerackody | |
| 5,463,656 A | 10/1995 | Polivka et al. | |
| 5,481,570 A | 1/1996 | Winters | |
| 5,490,174 A | 2/1996 | Shin et al. | |
| 5,504,775 A | 4/1996 | Chouly et al. | |
| 5,509,015 A | 4/1996 | Tiedemann, Jr. et al. | |
| 5,515,378 A | 5/1996 | Roy, III et al. | |
| 5,541,954 A | 7/1996 | Emi | |
| 5,570,349 A | 10/1996 | Bustamante et al. | |
| 5,598,428 A | 1/1997 | Sato | |
| 5,613,211 A | 3/1997 | Matsuno | |
| 5,613,219 A | 3/1997 | Vogel et al. | |
| 5,654,955 A | 8/1997 | Natali | |
| 5,657,313 A | 8/1997 | Takahashi et al. | |
| 5,657,355 A | 8/1997 | Reusens | |
| 5,661,780 A | 8/1997 | Yamamoto et al. | |
| 5,689,502 A | 11/1997 | Scott | |
| 5,694,388 A | 12/1997 | Sawahashi et al. | |
| 5,732,068 A | 3/1998 | Takahashi et al. | |
| 5,732,113 A | 3/1998 | Schmidl et al. | |
| 5,734,647 A | 3/1998 | Yoshida et al. | |
| 5,745,860 A | 4/1998 | Kallin | |
| 5,752,168 A | 5/1998 | Monot et al. | |
| 5,752,202 A | 5/1998 | Obright | |
| 5,799,000 A | 8/1998 | Hoole | |
| 5,802,044 A | 9/1998 | Baum et al. | |
| 5,864,543 A | 1/1999 | Hoole | |
| 5,875,208 A | 2/1999 | Hoole | |
| 5,896,425 A | 4/1999 | Hirano et al. | |
| 5,907,577 A | 5/1999 | Hoole | |
| 5,923,700 A | 7/1999 | Zhang | |
| 5,924,034 A | 7/1999 | Dupuy | |
| 5,933,421 A * | 8/1999 | Alamouti et al. | 370/330 |
| 5,933,478 A | 8/1999 | Ozaki et al. | |
| 5,943,375 A | 8/1999 | Veintimilla | |
| 5,987,338 A | 11/1999 | Gibbons et al. | |
| 5,999,569 A | 12/1999 | Oshima | |
| 6,047,200 A | 4/2000 | Gibbons et al. | |
| 6,064,338 A | 5/2000 | Kobayakawa et al. | |
| 6,073,032 A | 6/2000 | Keskitalo et al. | |
| 6,081,566 A | 6/2000 | Molnar et al. | |
| 6,084,932 A | 7/2000 | Veintimilla | |
| 6,085,114 A | 7/2000 | Gibbons et al. | |
| 6,128,276 A | 10/2000 | Agee | |
| 6,131,016 A | 10/2000 | Greenstein et al. | |
| 6,160,839 A | 12/2000 | Zhang | |
| 6,175,555 B1 | 1/2001 | Hoole | |
| 6,198,719 B1 * | 3/2001 | Faruque et al. | 370/209 |
| 6,215,777 B1 | 4/2001 | Chen et al. | |
| 6,216,019 B1 | 4/2001 | Gibbons et al. | |
| 6,347,236 B1 | 2/2002 | Gibbons et al. | |
| 6,359,923 B1 | 3/2002 | Agee et al. | |
| 6,408,016 B1 | 6/2002 | Zhang | |
| 6,442,222 B1 | 8/2002 | Ghazi-Moghadam et al. | |
| 6,480,522 B1 | 11/2002 | Hoole et al. | |
| 6,487,235 B2 | 11/2002 | Hoole | |
| 6,501,771 B2 | 12/2002 | Hoole | |
| 6,510,182 B1 | 1/2003 | Lee et al. | |
| 6,519,278 B1 | 2/2003 | Hiramatsu | |
| 6,560,209 B1 * | 5/2003 | Alamouti et al. | 370/330 |
| 6,584,144 B2 | 6/2003 | Alamouti et al. | |
| 6,600,776 B1 | 7/2003 | Alamouti et al. | |
| 2002/0034217 A1 | 3/2002 | Zhang | |
| 2002/0122465 A1 | 9/2002 | Agee et al. | |
| 2003/0053488 A1 | 3/2003 | Hoole | |

FOREIGN PATENT DOCUMENTS

| | | |
|---|---|---|
| EP | 0 637 181 B1 | 2/1995 |
| EP | 0 639 035 A1 | 2/1995 |
| EP | 0 641 096 A1 | 3/1995 |
| EP | 0 653 859 A1 | 5/1995 |
| EP | 0 653 973 B1 | 5/1995 |
| EP | 0 668 664 A1 | 8/1995 |
| EP | 0 685 973 A2 | 12/1995 |
| EP | 0 690 593 A2 | 1/1996 |
| EP | 0 696 856 A2 | 2/1996 |
| WO | WO 94/05094 A1 | 3/1994 |
| WO | WO 94/13077 A1 | 6/1994 |
| WO | WO 94/19877 A1 | 9/1994 |
| WO | WO 95/09512 A1 | 4/1995 |
| WO | WO 95/10144 A1 | 4/1995 |
| WO | WO 95/32595 A1 | 11/1995 |
| WO | WO 96/09731 A1 | 3/1996 |
| WO | WO 96/22662 A1 | 7/1996 |
| WO | WO 96/31009 A1 | 10/1996 |
| WO | WO 96/36136 A1 | 11/1996 |
| WO | WO 96/39001 A1 | 12/1996 |
| WO | WO 97/01256 A1 | 1/1997 |
| WO | WO 97/02665 A | 1/1997 |
| WO | WO 97/05709 A1 | 2/1997 |
| WO | WO 98/35463 A2 | 8/1998 |
| WO | WO 98/37638 A3 | 8/1998 |

OTHER PUBLICATIONS

Chan et al., "Efficient Frequency Assignments Scheme for Intermodulation Distortion Reduction in Fiber–Optic Microcellular Systems," Electronic Letters, Oct. 27, 1994, pp. 1831–1832, vol. 30, No. 22, IEEE, Stevenage, UK.

Chang, "Synthesis of Band Limited Orthogonal Signals for Multichannel Data Transmission," Bell System Technical Journal, Dec. 1996, pp. 1775–1796, American Telephone and Telegraph Co., New York.

Cimini, Leonard J., Jr., "Analysis and Simulation of a Digital Mobile Channel Using Orthogonal Frequency Division Multiplexing" IEEE Transactions on Communications, Jul. 1985, pp. 665–675, vol. Comm. 33, No 7, IEEE, New York.

Davies et al., Telecom Australia, Rev. Activities, 1985/1986, pp. 41–43.

Davies et al., "Proposed Advanced Base Station Antennas for Future Cellular Mobile Radio Systems," A.T.R., 1998, pp. 53–60, vol. 22, No. 1, Telecom Research Australia Lab, Australia.

Fazel, "Narrow–Band Interface Rejection in Orthogonal Multi–Carrier Spread Spectrum Communications," Record, 1994, Third Annual International Conference on Universal Personal Communications, IEEE, 1994, pp. 46–50.

Fazel, K., "Performance of CDMA/OFDM for Mobile Communication System," Second IEEE International Conference on Universal Personal Communications, Ottawa, Ontario, Oct. 12–15, 1993, pp. 975–979.

Ghazi–Moghadam, V. et al, "Interference Cancellation Using Adaptive Antennas," Sixth IEEE International Symposium on Personal, Indoor and Mobile Radio Communications, Sep. 1995, pp. 936–939.

Giner, V.C., "An Approximate Analysis of TDMA Out–of–Slot Random Access Protocols for Microcellular Mobile Communications," Int'l Journal of Wireless Information Networks, Jan. 1996, pp. 41–53, vol. 3 No. 1, XP002077581.

Iwai, H. et al., "An Investigation of Space–Path Hybrid Diversity Scheme for Base Station Reception in CDMA Mobile Radio," IEEE J.Sel.Areas, Comm., Jun. 1994, pp. 962–969, vol. SAC–12.

Jung, P. et al., "On Multicarrier CDMA Radio Systems With Joint Detection and Coherent Receiver Antenna Diversity," 1996 $5^{th}$ IEEE International Conference on Universal Personal Communication, Sep. 1996, pp. 61–65, vol. 1., IEEE, New York, XP00203391.

Kohno, R. et al., "A Spatially and Temporally Optimal Multi–User Receiver Using an Array Antenna for DS/CDMA," Sixth IEEE International Symposium on Personal, Indoor and Mobile Radio Communications, Sep. 1995, pp. 950–954, Toronto.

Litva, et al, "Fundamentals of Digital Beamforming," Digital Beamforming in Wireless Communications, 1996 Artech House, Inc., Chapter 2, pp. 13–57.

Naguib, A.F. et al., "Performance of CDMA Cellular Networks with Base–Station Antenna Arrays," in C.G. Gunther, ed. "Mobile Communications—Advanced Systems and Components," Springer–Verlag, Mar. 1994, pp. 87–100.

Ojanpera et al., "Frames–Hybrid Multiple Access Technology," 1996 IEEE $4^{th}$ Int'l Symposium on Spread Spectrum Techniques, Sep. 22–25, 1996, vol. 1, pp. 320–324.

Prasad, Ramjee, "CDMA System Concepts," CDMA For Wireless Personal Communications, 1196 Artech House, Inc. Chapter 3, pp. 39–61.

Proc. Virginia Tech Third Symposium on Wireless Personal Communications, Jun. 1993, pp. 15–1 to 5–12.

Quach, B. et al., "Hopfield Network Approach to Beamforming in Spread Spectrum Communications," IEEE Proc. Seventh SP Workshop on Statistical Signal and Array Processing, Jun. 1994, pp. 409–412.

Rappaport, Theodore S., "Multiple Access Techniques for Wireless Communications," Wireless Communications: Principles and Practice, 1996 Prentice Hall, Chapter 8, pp. 395–410.

Rappaport et al., editors. "Wireless Personal Communications: Trends and Challenges," Kluwer Academic Publishers, 1994, Ch. 7, pp. 60–80.

Rohling H. et al., "Performance of an OFDM–TDMA Mobile Communication System," 1996 IEEE $46^{th}$ Vehicular Technology Conference 46, Apr. 28–May 1, 1996, vol. 3 No. 46, pp. 1589–1593, Atlanta XP000595799.

Sandhu, A. et al. "Hopfield Neurobeamerformer for Spread Spectrum Communications," Sixth IEEE International Symposium on Personal, Indoor and Mobile Radio Communications, Sep. 1995.

Swales et al., "The Performance Enhancement of Multibeam Adaptive Base–Station Antennas for Cellular Land Mobile Radio Systems," IEEE Transactions on Vehicular Technology, Feb. 1990, pp. 56–67, vol. 39, No. 1, IEEE, New York.

Tsoulos, G. et al, "Adaptive Antennas for Third Generation DS–CDMA Cellular Systems," Proc. IEEE VTC'95, Aug. 1995, pp. 45–49.

Vandendorpe, L., "Multitone Direct Sequence CDMA System in an Indoor Wireless Environment," IEEE First Symposium on Communications and Vehicular Technology, Benelux Delft Netherlands, Oct. 27–28, 1993, pp. 4.1–1 to 4.1–8.

Vandendorpe, L., "Multitone Spread Spectrum Multiple Access Communications System in a Multipath Rician Fading Channel," IEEE Transactions on Vehicular Technology, vol. 44 No. 2, May 1995, pp. 327–337.

Vandendorpe, L. et al., "Analysis of Residual Interference After MSE Linear Equalization of Multitone Spread Spectrum Signals," Communications–Gateway to Globalization, Proceedings of the Conference on Communications, Seattle, Jun. 18–22, 1995, vol. 3, pp. 1673–1677, XP000535041.

Vandendorpe, L. et al., "Performance Analysis of Linear Joint Multiple Access Interference Cancellation–Equalization for Asynchronous Multitone CDMA," IEEE, Sep. 25, 1995, pp. 537–541, XP000610292.

Wang, Y. et al, "Adaptive Antenna Arrays for Cellular CDMA Communication Systems," Proc. IEEE International Conference Acoustics, Speech and Signal Processing, Detroit, 1995, pp. 1725–1728.

Weinstein and Ebert, IEEE Trans. on Comm, Tech., vol. com–19, No. 5, Oct. 1971, p. 628.

Yee et al. "Multicarrier CDMA in Indoor Wireless Radio Networks," Proc. PIMRC '93, Sep. 1993, pp. 109–113, Yokohama, Japan.

Yee et al., "Multi–Carrier CDMA in Indoor Wireless Radio Networks," IEICE Transactions on Communications, Jul. 1994, pp. 900–904, vol. E77–B No. 7.

* cited by examiner

FIG. 1.1
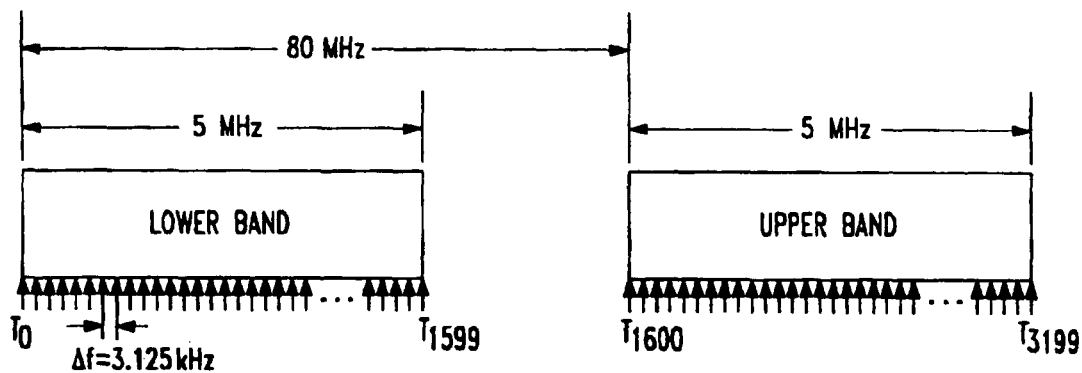
FIG. 1.2
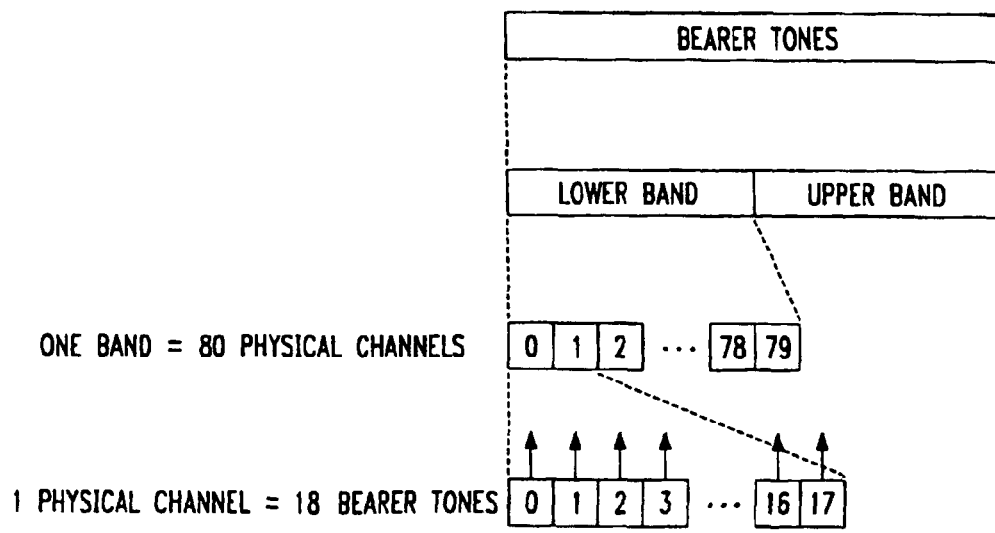

FIG. 1.3
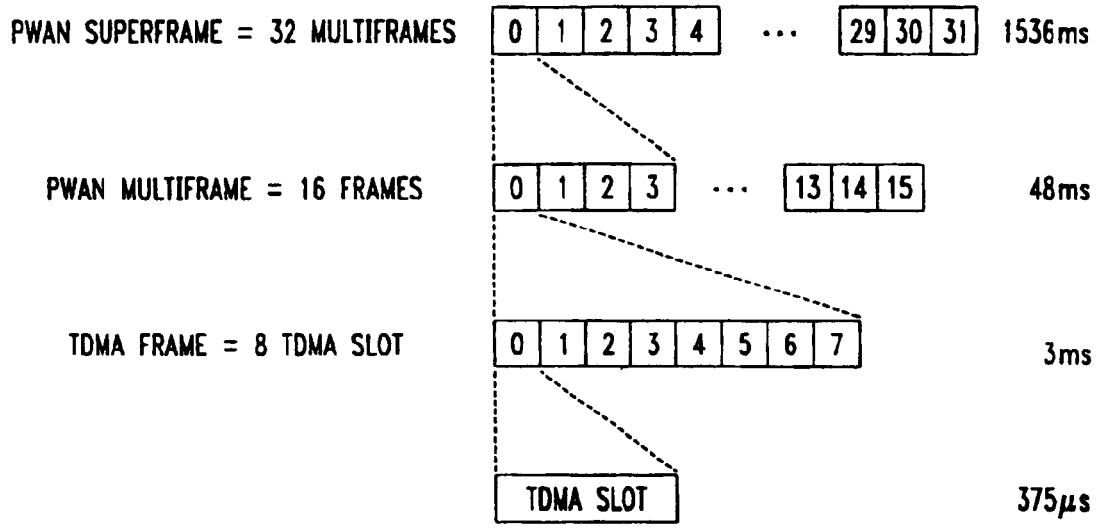
FIG. 1.4
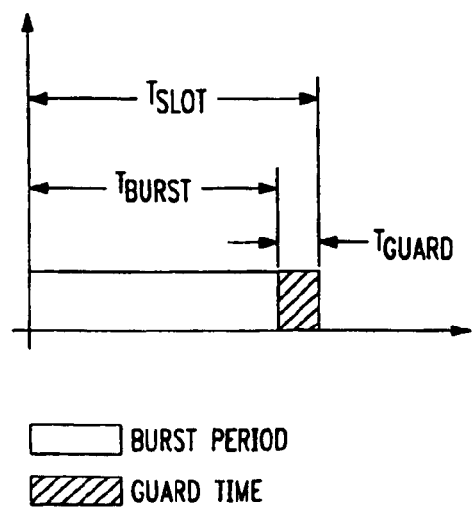

FIG. 1.5
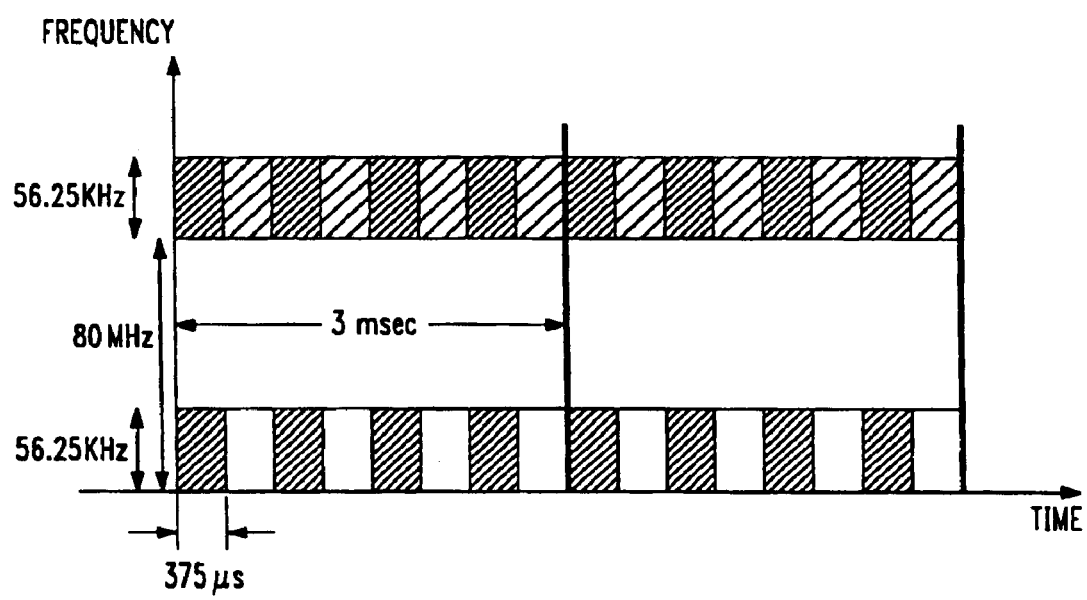

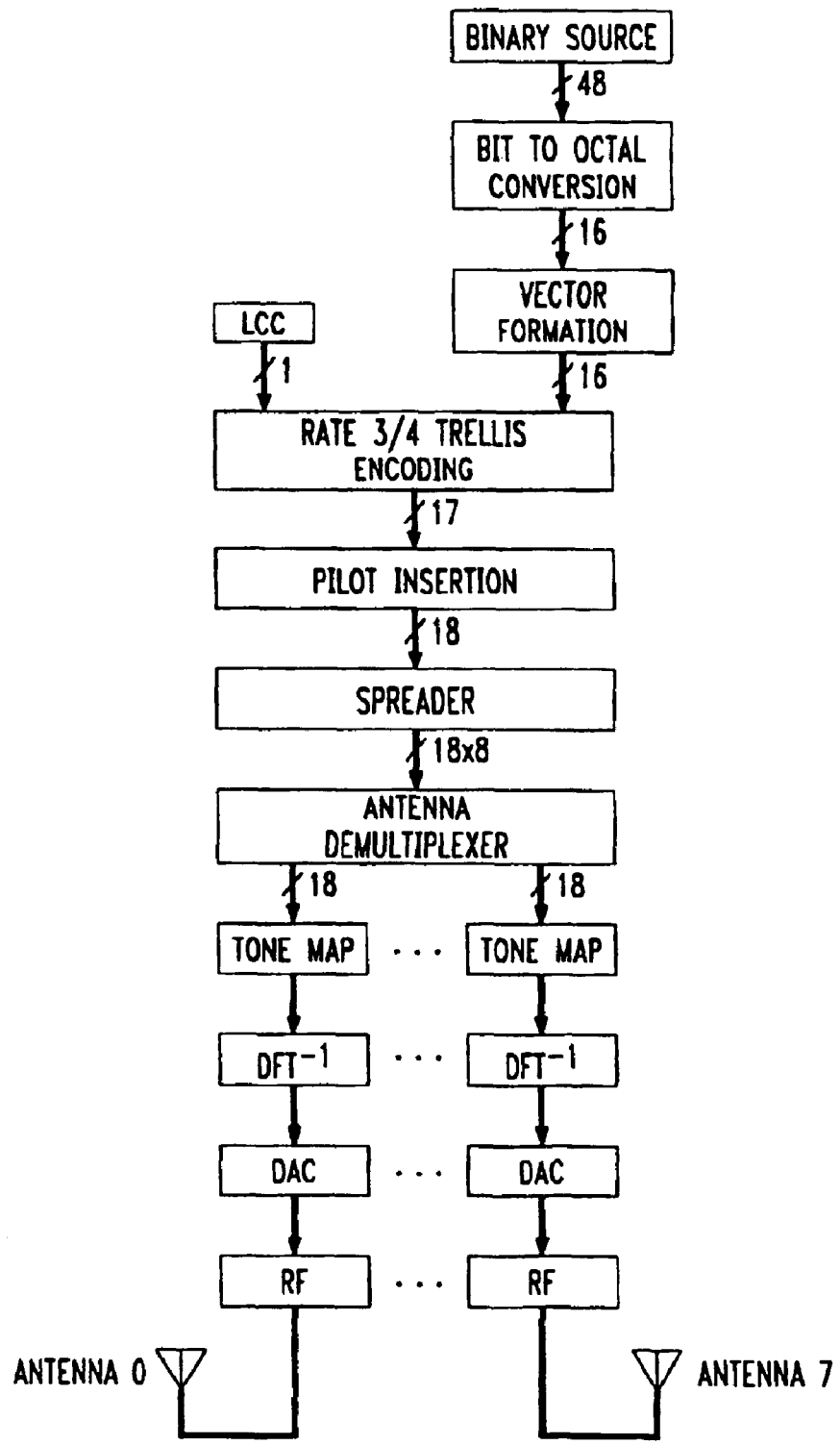
FIG. 1.6

*FIG. 1.7*
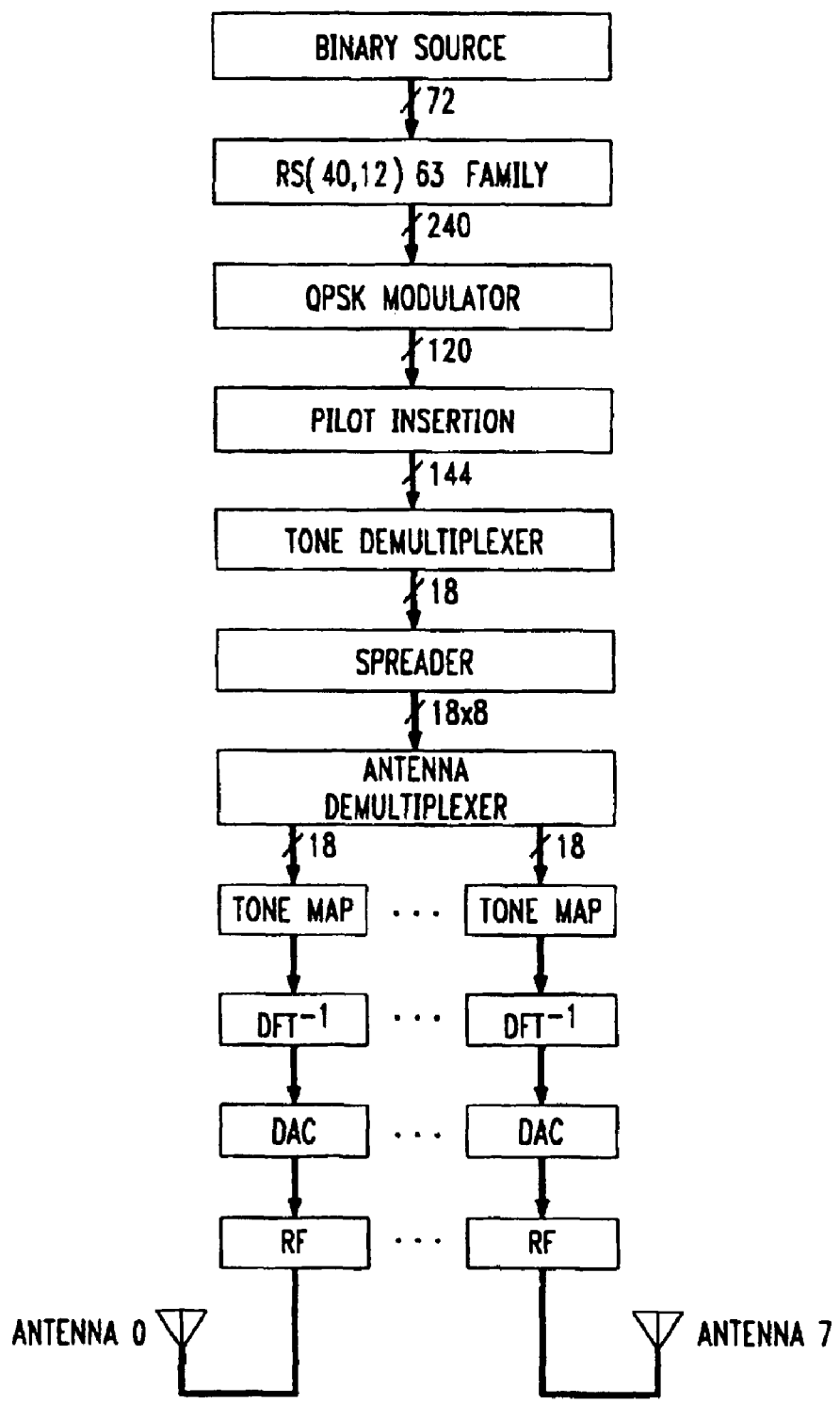

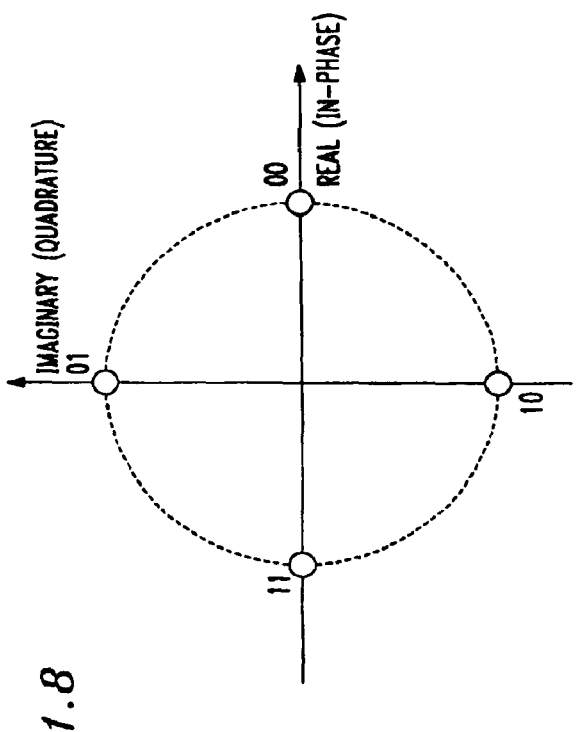
FIG. 1.8
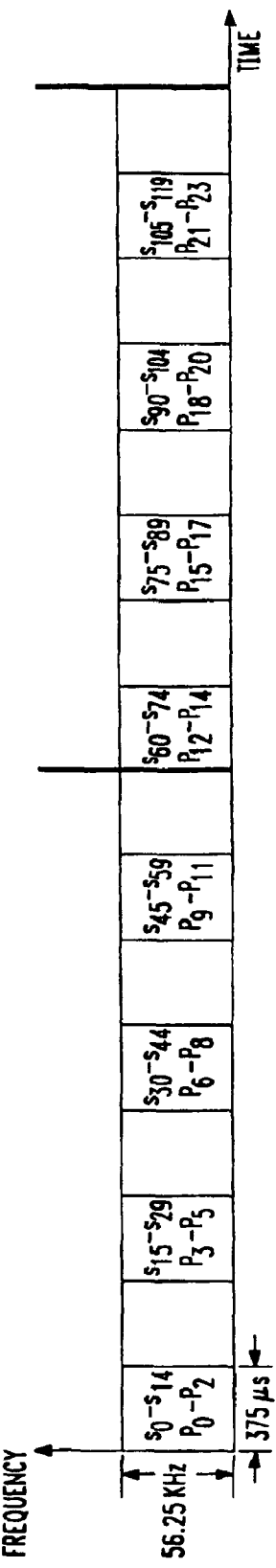
FIG. 1.9

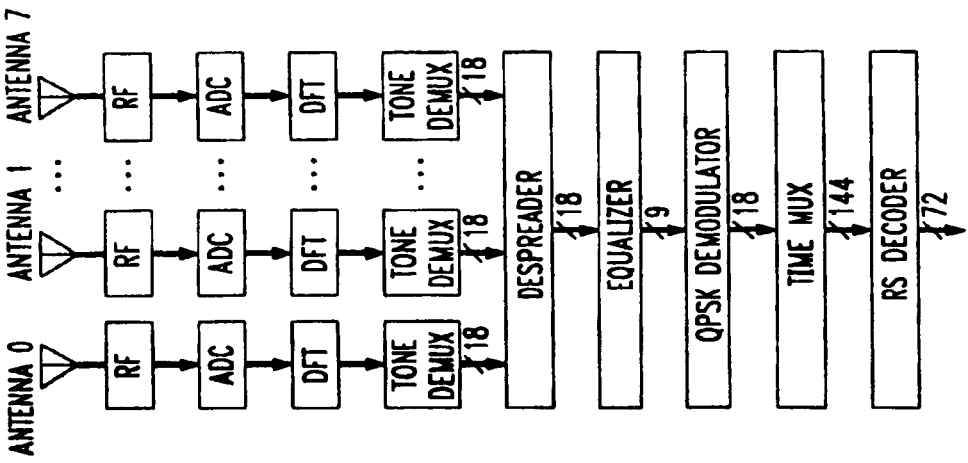
FIG. 1.11
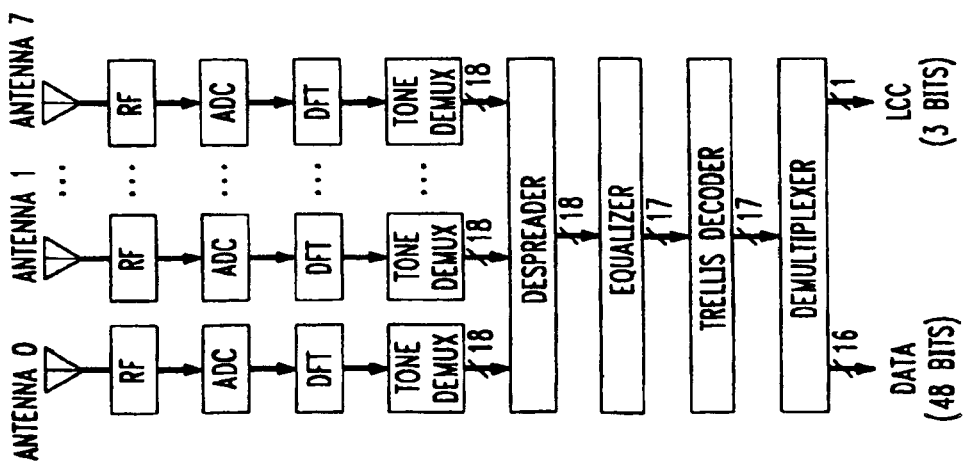
FIG. 1.10

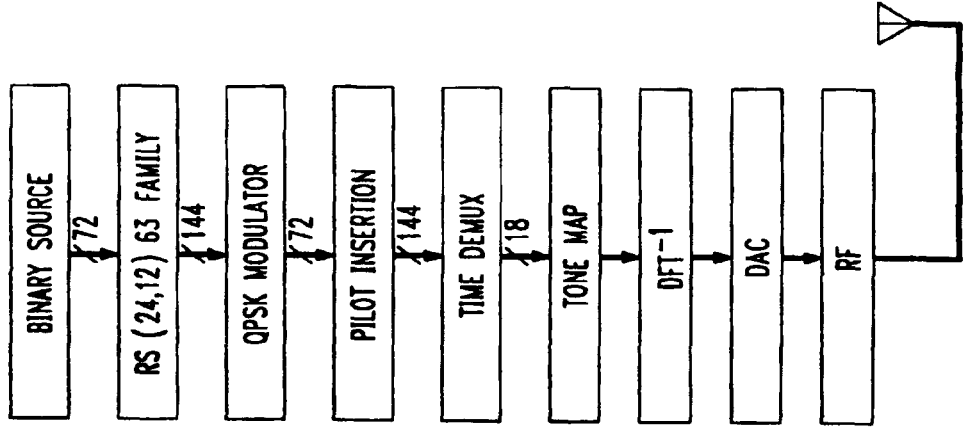
FIG. 1.13
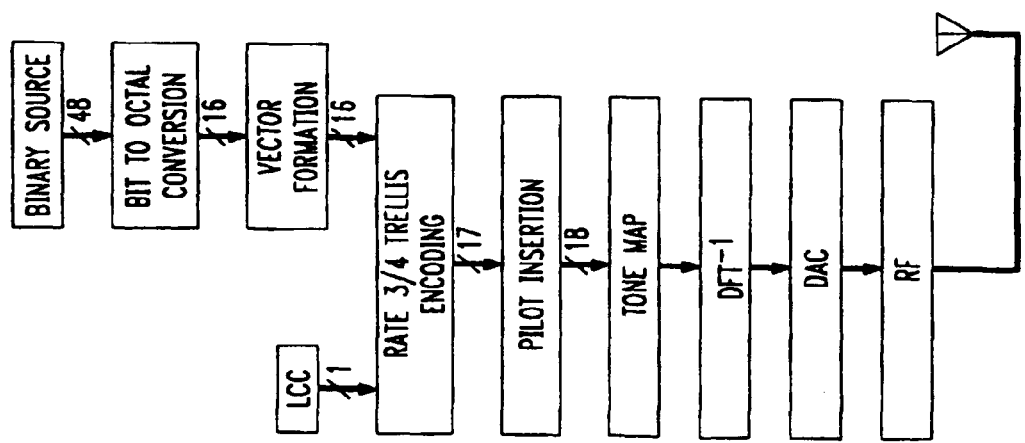
FIG. 1.12

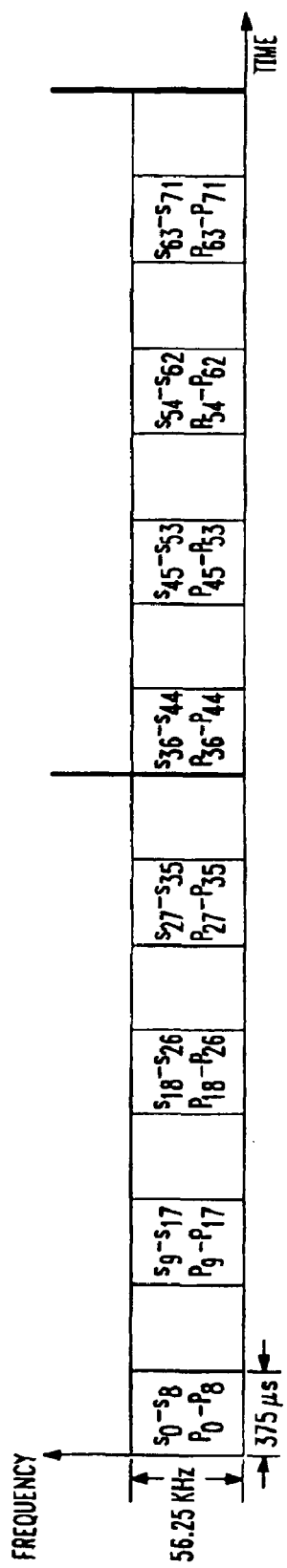
FIG. 1.14

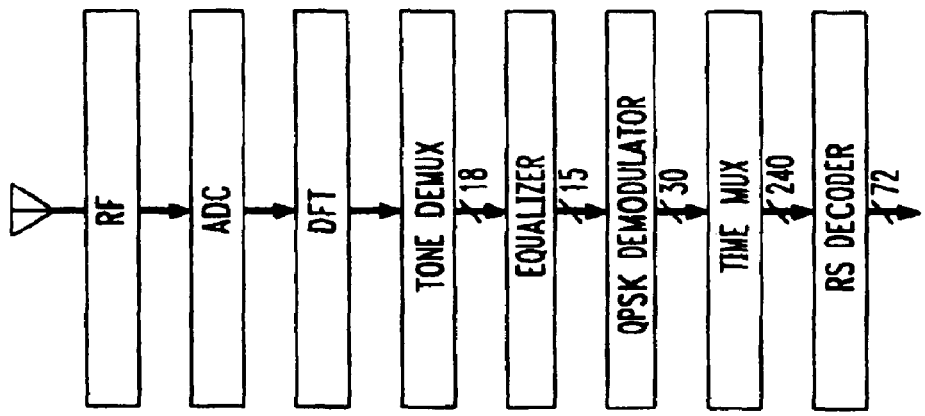
FIG. 1.16
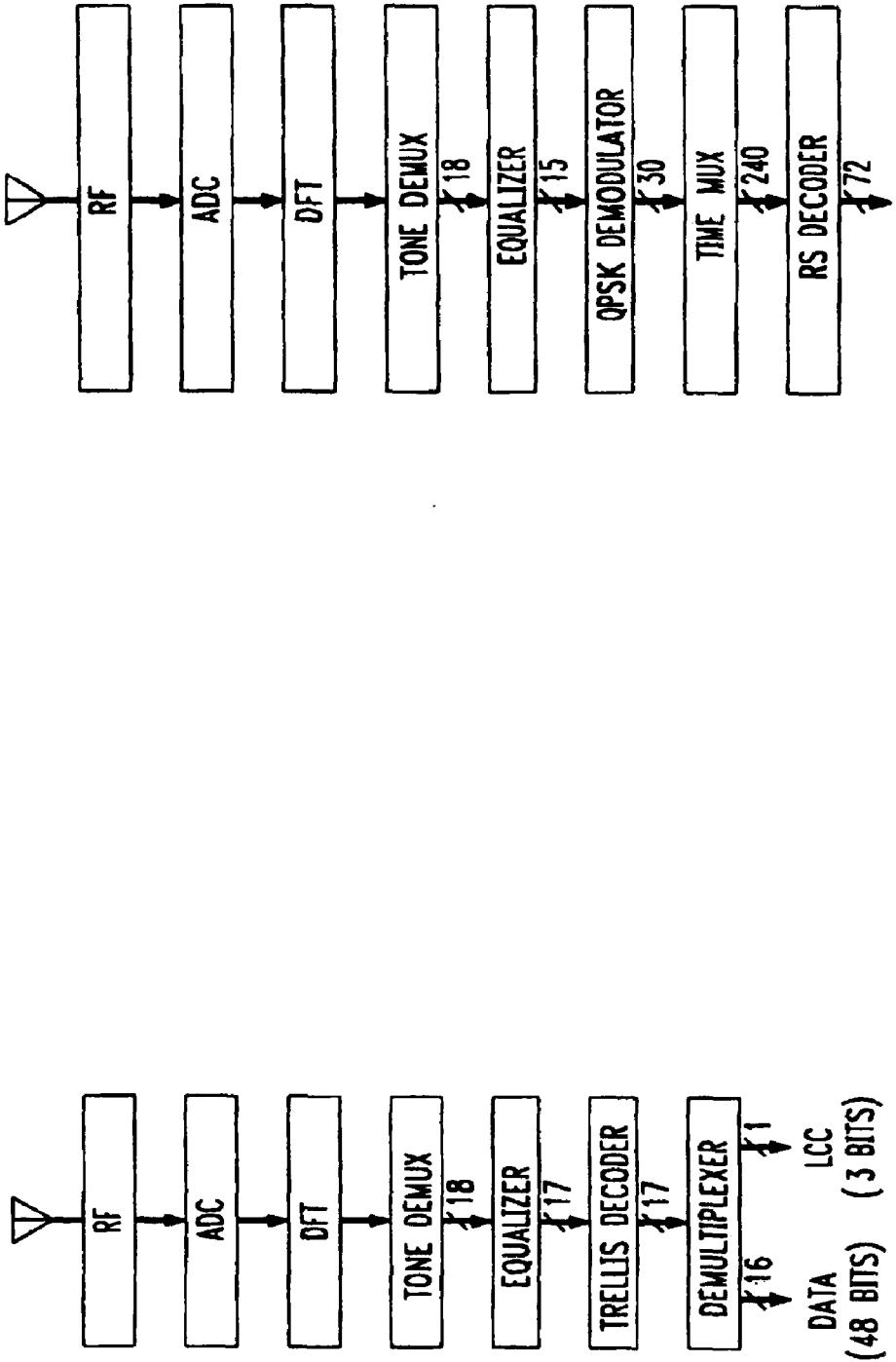
FIG. 1.15

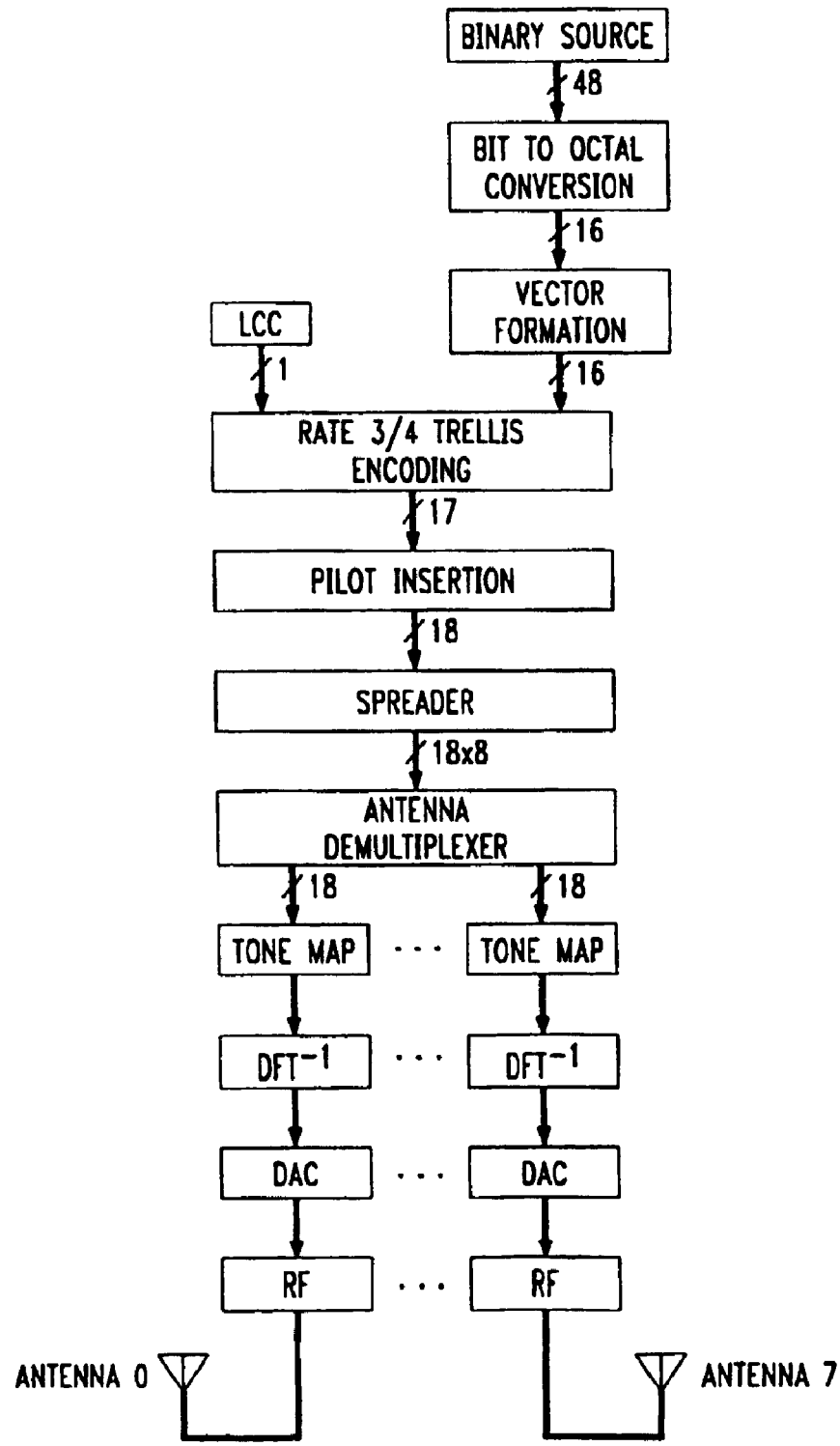
FIG. 2.1

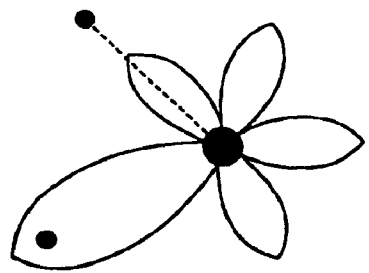
FIG. 3.1
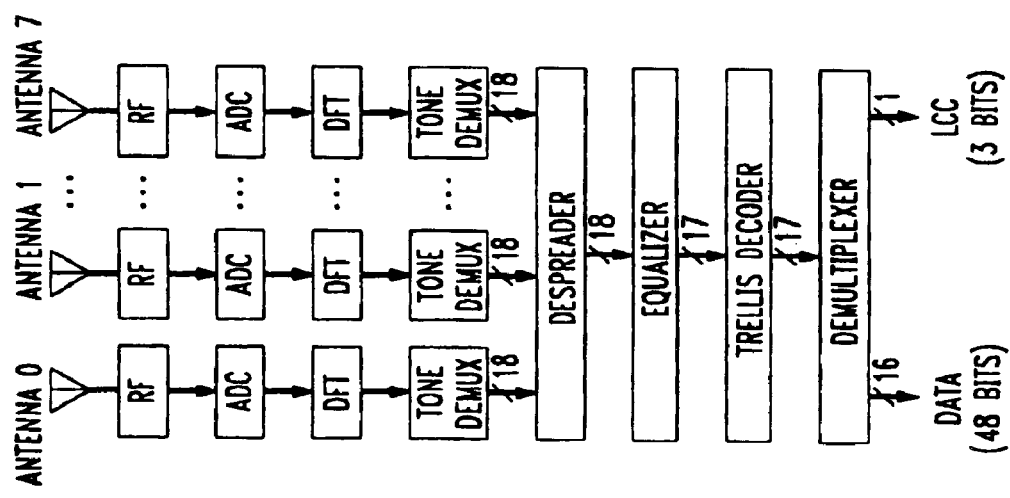
FIG. 2.2

FIG. 3.2
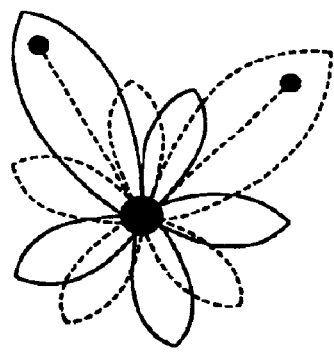
FIG. 4.1
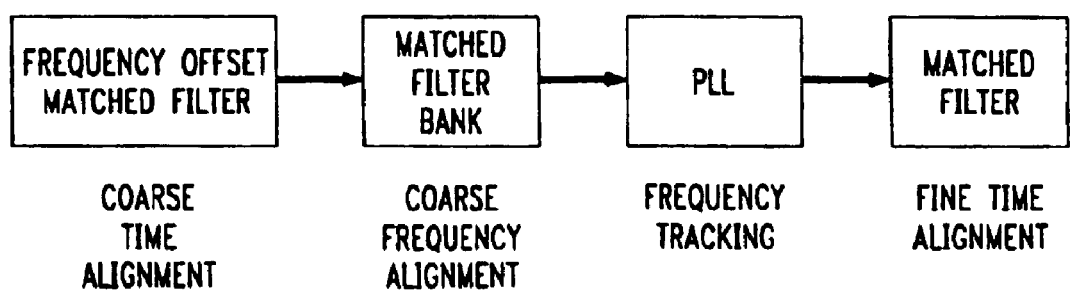
| FREQUENCY OFFSET MATCHED FILTER | MATCHED FILTER BANK | PLL | MATCHED FILTER |
|---|---|---|---|
| COARSE TIME ALIGNMENT | COARSE FREQUENCY ALIGNMENT | FREQUENCY TRACKING | FINE TIME ALIGNMENT |

FIG. 4.2
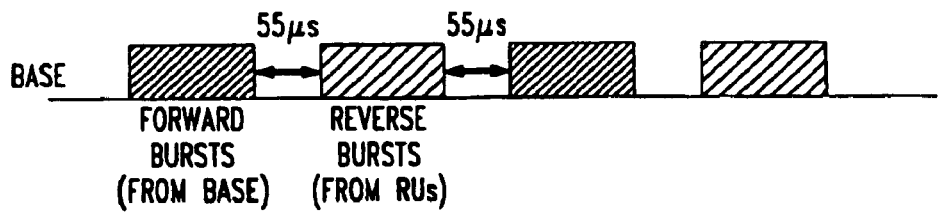
FIG. 4.3
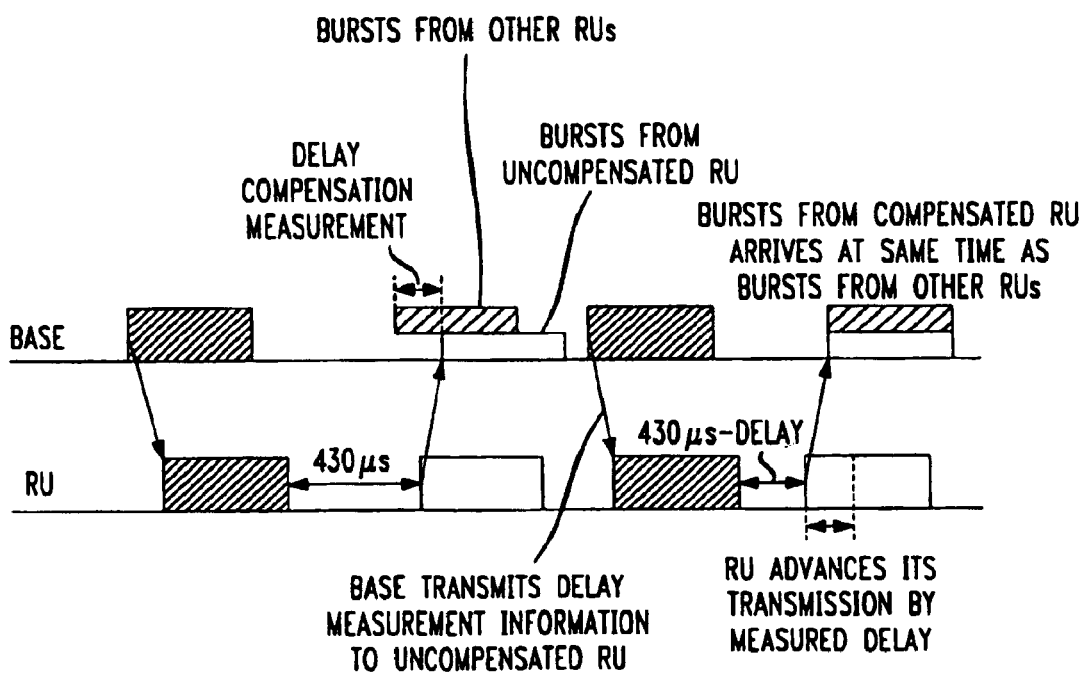

METHOD FOR FREQUENCY DIVISION DUPLEX COMMUNICATIONS

CROSS-REFERENCE TO RELATED APPLICATIONS

This application is a continuation of U.S. patent application Ser. No. 09/294,174 filed on Apr. 19, 1999 now U.S. Pat. No. 6,560,209, which is a continuation of U.S. Pat. No. 08/796,584, filed on Feb. 6, 1997, both herein incorporated in their entirety by reference.

The invention disclosed herein is related to the copending U.S. patent application by Gibbons, et al entitled "REMOTE WIRELESS UNIT HAVING REDUCED POWER OPERATING MODE", Ser. No. 08/796,586, filed on the same day as the instant patent application, assigned to AT&T Wireless Services, Inc. and incorporated herein by reference.

The invention disclosed herein is related to the copending U.S. patent application by Greg Veintimilla, entitled "METHOD TO INDICATE SYNCHRONIZATION LOCK OF A REMOTE STATION WITH A BASE STATION", Ser. No. 08/796,492, filed on the same day as the instant patent application, assigned to AT&T Wireless Services, Inc. and incorporated herein by reference.

The invention disclosed herein is related to the copending U.S. patent application by Elliott Hoole, entitled "DELAY COMPENSATION", Ser. No. 08/796,991, filed on the same day as the instant patent application, assigned to AT&T Wireless Services, Inc. and incorporated herein by reference.

BACKGROUND OF THE INVENTION

1. Field of the Invention

This invention involves improvements to communications systems and methods in a wireless, frequency division duplex communications system.

2. Description of Related Art

Wireless communications systems, such as cellular and personal communications systems, operate over limited spectral bandwidths. They must make highly efficient use of the scarce bandwidth resource to provide good service to a large population of users. Examples of such communications systems that deal with high user demand and scarce bandwidth resources are wireless communications systems, such as cellular and personal communications systems.

Various techniques have been suggested for such systems to increase bandwidth-efficiency, the amount of information that can be transmitted within a given spectral bandwidth. Many of these techniques involve reusing the same communication resources for multiple users while maintaining the identity of each user's message. These techniques are generically referred to as multiple access protocols. Among these multiple access protocols are Time Division Multiple Access (TDMA), Code Division Multiple Access (CDMA), Space Division Multiple Access (SDMA), and Frequency Division Multiple Access (FDMA). The technical foundations of these multiple access protocols are discussed in the recent book by Rappaport entitled "Wireless Communications Principles and Practice", Prentice Hall, 1996.

The Time Division Multiple Access (TDMA) protocol sends information from a multiplicity of users on one assigned frequency bandwidth by time division multiplexing the information from the various users. In this multiplexing scheme, particular time slots are devoted to specific users. Knowledge of the time slot during which any specific information is transmitted, permits the separation and reconstruction of each user's message at the receiving end of the communication channel.

The Code Division Multiple Access (CDMA) protocol uses a unique code to distinguish each user's data signal from other users' data signals. Knowledge of the unique code with which any specific information is transmitted, permit the separation and reconstruction of each user's message at the receiving end of the communication channel. There are four types of CDMA protocols classified by modulation: direct sequence (or pseudo-noise), frequency hopping, time hopping, and hybrid systems. The technical foundations for CDMA protocols are discussed in the recent book by Prasad entitled "CDMA for Wireless Personal Communications", Artech House, 1996.

The Direct Sequence CDMA (DS-CDMA) protocol spreads a user's data signal over a wide portion of the frequency spectrum by modulating the data signal with a unique code signal that is of higher bandwidth than the data signal. The frequency of the code signal is chosen to be much larger than the frequency of the data signal. The data signal is directly modulated by the by the code signal and the resulting encoded data signal modulates a single, wideband carrier that continuously covers a wide frequency range. After transmission of the DS-CDMA modulated carrier signal, the receiver uses a locally generated version of the user's unique code signal to demodulate the received signal and obtain a reconstructed data signal. The receiver is thus able to extract the user's data signal from a modulated carrier that bears many other users' data signals.

The Frequency Hopping Spread Spectrum (FHSS) protocol uses a unique code to change a value of the narrowband carrier frequency for successive bursts of the user's data signal. The value of the carrier frequency varies in time over a wide range of the frequency spectrum in accordance with the unique code. The term Spread Spectrum Multiple Access (SSMA) is also used for CDMA protocols such as DS-CDMA and FHSS that use a relatively wide frequency range over which to distribute a relatively narrowband data signal.

The Time Hopping CDMA (TH-CDMA) protocol uses a single, narrow bandwidth, carrier frequency to send bursts of the user's data at intervals determined by the user's unique code. Hybrid CDMA systems include all CDMA systems that employ a combination of two or more CDMA protocols, such as direct sequence/frequency hopping (DS/FH), direct sequence/time hopping (DS/TH), frequency hopping/time hopping (FH/TH), and direct sequence/frequency hopping/time hopping (DS/FH/TH).

The Space Division Multiple Access (SDMA) transmission protocol forms directed beams of energy whose radiation patterns do not overlap spatially with each other, to communicate with users at different locations. Adaptive antenna arrays can be driven in phased patterns to simultaneously steer energy in the direction of selected receivers. With such a transmission technique, the other multiplexing schemes can be reused in each of the separately directed beams. For example, the specific codes used in CDMA can be transmitted in two different beams. Accordingly, if the beams do not overlap each other, different users can be assigned the same code as long as they do not receive the same beam.

The Frequency Division Multiple Access (FDMA) protocol services a multiplicity of users over one frequency band by devoting particular frequency slots to specific users, i.e., by frequency division multiplexing the information associated with different users. Knowledge of the frequency slot in which any specific information resides permits reconstruction of each user's information at the receiving end of the communication channel.

Orthogonal Frequency Division Multiplexing (OFDM) addresses a problem that is faced, for example, when pulsed signals are transmitted in an FDMA format. In accordance with principles well known in the communication sciences, the limited time duration of such signals inherently broadens the bandwidth of the signal in frequency space. Accordingly, different frequency channels may significantly overlap, defeating the use of frequency as a user-identifying-parameter, the principle upon which FDMA is based. However, pulsed information that is transmitted on specific frequencies can be separated, in accordance with OFDM principle, despite the fact that the frequency channels overlap due to the limited time duration of the signals. OFDM requires a specific relationship between the data rate and the carrier frequencies. Specifically, the total signal frequency band is divided into N frequency sub-channels, each of which has the same data rate 1/T. These data streams are then multiplexed onto a multiplicity of carriers that are separated in frequency by 1/T. Multiplexing signals under these constraints results in each carrier having a frequency response that has zeroes at multiples of 1/T. Therefore, there is no interference between the various carrier channels, despite the fact that the channels overlap each other because of the broadening associated with the data rate. OFDM is disclosed, for example, by Chang in Bell Sys. Tech. Jour., Vol. 45, pp. 1775–1796, December. 1966, and in U.S. Pat. No. 4,488,445.

Parallel Data Transmission is a technique related to FDMA. It is also referred to as Multitone Transmission (MT), Discrete Multitone Transmission (DMT) or Multi-Carrier Transmission (MCT). Parallel Data Transmission has significant calculational advantages over simple FDMA. In this technique, each user's information is divided and transmitted over different frequencies, or "tones", rather than over a single frequency, as in standard FDMA. In an example of this technique, input data at NF bits per second are grouped into blocks of N bits at a data rate of F bits per second. N carriers or "tones" are then used to transmit these bits, each carrier transmitting F bits per second. The carriers can be spaced in accordance with the principles of OFDM.

Both the phase and the amplitude of the carrier can be varied to represent the signal in multitone transmission. Accordingly, multitone transmission can be implemented with M-ary digital modulation schemes. In an M-ary modulation scheme, two or more bits are grouped together to form symbols and one of the M possible signals is transmitted during each symbol period. Examples of M-ary digital modulation schemes include Phase Shift Keying (PSK), Frequency Shift Keying (FSK), and higher order Quadrature Amplitude Modulation (QAM). In QAM a signal is represented by the phase and amplitude of a carrier wave. In high order QAM, a multitude of points can be distinguished on a amplitude/phase plot. For example, in 64-ary QAM, 64 such points can be distinguished. Since six bits of zeros and ones can take on 64 different combinations, a six-bit sequence of data symbols can, for example, be modulated onto a carrier in 64-ary QAM by transmitting only one value set of phase and amplitude, out of the possible 64 such sets.

Suggestions have been made to combine some of the above temporal and spectral multiplexing techniques. For example, in U.S. Pat. No. 5,260,967, issued to Schilling, there is disclosed the combination of TDMA and CDMA. In U.S. Pat. No. 5,291,475, issued to Bruckert, and in U.S. Pat. No. 5,319,634 issued to Bartholomew, the combination of TDMA, FDMA, and CDMA is suggested.

Other suggestions have been made to combine various temporal and spectral multiple-access techniques with spatial multiple-access techniques. For example, in U.S. Pat. No 5,515,378, filed Dec. 12, 1991, Roy suggests "separating multiple messages in the same frequency, code, or time channel using the fact that they are in different spatial channels." Roy suggests specific application of his technique to mobile cellular communications using an "antenna array". Similar suggestions were made by Swales et. al., in the IEEE Trans. Veh. Technol. Vol. 39. No. 1 February. 1990, and by Davies et. al. in A.T.R., Vol. 22, No. 1, 1988 and in Telecom Australia, Rev. Act., 1985/86 pp. 41–43.

Gardner and Schell suggest the use of communications channels that are "spectrally disjoint" in conjunction with "spatially separable" radiation patterns in U.S. Pat. No. 5,260,968, filed Jun. 23, 1992. The radiation patterns are determined by restoring "self coherence" properties of the signal using an adaptive antenna array. "[A]n adaptive antenna array at a base station is used in conjunction with signal processing through self coherence restoral to separate the temporally and spectrally overlapping signals of users that arrive from different specific locations." See the Abstract of the Invention. In this patent, however, adaptive analysis and self coherence restoral is only used to determine the optimal beam pattern; ". . . conventional spectral filters . . . [are used] . . . to separate spatially inseparable filters."

Winters suggests "adaptive array processing" in which "[t]he frequency domain data from a plurality of antennas are . . . combined for channel separation and conversion to the time domain for demodulation," in U.S. Pat. No 5,481,570, filed Oct. 20, 1993. Column 1 lines 66–67 and Column 2, lines 14–16.

Agee has shown that "the use of an M-element multiport antenna array at the base station of any communication network can increase the frequency reuse of the network by a factor of M and greatly broaden the range of input SINRs required for adequate demodulation . . . " ("Wireless Personal Communications: Trends and Challenges", Rappaport, Woerner and Reed, editors, Kluwer Academic Publishers, 1994, pp. 69–80, at page 69. see also, Proc. Virginia Tech. Third Symposium on Wireless Personal Communications, June 1993, pp. 15-1 to 15-12.)

Gardner and Schell also suggest in U.S. Pat. No. 5,260, 968, filed Jun. 23, 1992, "time division multiplexing of the signal from the base station and the users". . . "[i]n order to use the same frequency for duplex communications . . . " "[R]eception at the base station from all mobile units is temporally separated from transmission from the base station to all mobile units." Column 5, lines 44ff. In a similar vein, in U.S. Pat. No. 4,383,332 there is disclosed a wireless multi-element adaptive antenna array SDMA system where all the required adaptive signal processing is performed at baseband at the base station through the use of "time division retransmission techniques."

Fazel, "Narrow-Band Interference Rejection in Orthogonal Multi-Carrier Spread-Spectrum Communications", Record, 1994 Third Annual International Conference on Universal Personal Communications, IEEE, 1994, pp. 46–50 describes a transmission scheme based on combined spread spectrum and OFDM. A plurality of subcarrier frequencies have components of the spreaded vector assigned to them to provide frequency-diversity at the receiver site. The scheme uses frequency domain analysis to estimate interference, which is used for weighting each received subcarrier before despreading. This results in switching off those subcarriers containing the interference.

Despite the suggestions in the prior art to combine certain of the multiple access protocols to improve bandwidth efficiency, there has been little success in implementing such combinations. It becomes more difficult to calculate optimum operating parameters as more protocols are combined. The networks implementing combined multiple access protocols become more complex and expensive. Accordingly, the implementation of high-bandwidth efficiency communications using a combination of multiple access protocols continues to be a challenge.

SUMMARY OF THE INVENTION

The invention enables high quality PCS communications in environments where adjacent PCS service bands operate with out-of-band harmonics that would otherwise interfere with the system's operation. The highly bandwidth-efficient communications method combines a form of time division duplex (TDD), frequency division duplex (FDD), time division multiple access (TDMA), orthogonal frequency division multiplexing (OFDM), spatial diversity, and polarization diversity in various unique combinations. The invention provides excellent fade resistance. The invention enables changing a user's available bandwidth on demand by assigning additional TDMA slots during the user's session.

In one embodiment of the invention, TDD, FDD, TDMA, and OFDM are combined to enable a base station to efficiently communicate with many remote stations. The method includes the step of receiving at the base station a first incoming wireless signal comprising a plurality of first discrete frequency tones that are orthogonal frequency division multiplexed (OFDM) in a first frequency band from a first remote station during a first time division multiple access (TDMA) interval. Then the method includes the step of receiving at the base station a second incoming wireless signal comprising a plurality of second discrete frequency tones that are orthogonal frequency division multiplexed (OFDM) in the first frequency band from a second remote station during the first time division multiple access (TDMA) interval. The first and second stations accordingly have different sets of discrete frequency tones that are orthogonal frequency division multiplexed.

Then the method includes the step of receiving at the base station a third incoming wireless signal comprising a plurality of the first discrete frequency tones that are orthogonal frequency division multiplexed (OFDM) in the first frequency band from a third remote station during a second time division multiple access (TDMA) interval. The first and third stations accordingly are time division multiplexed by sharing the same set of discrete frequency tones in different TDMA intervals.

Then the method includes the step of receiving at the base station a fourth incoming wireless signal comprising a plurality of the second discrete frequency tones that are orthogonal frequency division multiplexed (OFDM) in the first frequency band from a fourth remote station during the second time division multiple access (TDMA) interval. The second and fourth stations accordingly are time division multiplexed by sharing the same set of discrete frequency tones in different TDMA intervals.

Then the method includes the step of transmitting at the base station the first outgoing wireless signal comprising a plurality of third discrete frequency tones that are orthogonal frequency division multiplexed (OFDM) in a second frequency band to the first remote station during a third time division multiple access (TDMA) interval. The first remote station and the base station accordingly are time division duplexed (TDD) by transmitting their respective signals at different TDMA intervals. In addition, the first remote station and the base station accordingly are frequency division duplexed (FDD) by transmitting their respective signals on different sets of discrete frequency tones in different frequency bands.

Then the method includes the step of transmitting at the base station the second outgoing wireless signal comprising a plurality of fourth discrete frequency tones that are orthogonal frequency division multiplexed (OFDM) in the second frequency band to the second remote station during the third time division multiple access (TDMA) interval. The second remote station and the base station accordingly are time division duplexed (TDD) by transmitting their respective signals at different TDMA intervals. In addition, the second remote station and the base station accordingly are frequency division duplexed (FDD) by transmitting their respective signals on different sets of discrete frequency tones in different frequency bands.

Then the method includes the step of transmitting at the base station the third outgoing wireless signal comprising the plurality of the third discrete frequency tones that are orthogonal frequency division multiplexed (OFDM) in the second frequency band to the third remote station during a fourth time division multiple access (TDMA) interval. The third remote station and the base station accordingly are time division duplexed (TDD) by transmitting their respective signals at different TDMA intervals. In addition, the third remote station and the base station accordingly are frequency division duplexed (FDD) by transmitting their respective signals on different sets of discrete frequency tones in different frequency bands.

Then the method includes the step of transmitting at the base station the fourth outgoing wireless signal comprising the plurality of the fourth discrete frequency tones that are orthogonal frequency division multiplexed (OFDM) in the second frequency band to the fourth remote station during the fourth time division multiple access (TDMA) interval. The fourth remote station and the base station accordingly are time division duplexed (TDD) by transmitting their respective signals at different TDMA intervals. In addition, the fourth remote station and the base station accordingly are frequency division duplexed (FDD) by transmitting their respective signals on different sets of discrete frequency tones in different frequency bands.

In another embodiment of the invention, TDD, FDD, TDMA, OFDM, and space diversity are combined to enable a base station to efficiently communicate with many remote stations. This is possible because of the multiple element antenna array at the base station that is controlled by despreading and spreading weights. The spreading weights enable the base station to steer the signals it transmits to remote stations that are have a sufficient geographic separation from one another. The despreading weights enable the base station to steer the receive sensitivity of the base station toward the sources of signals transmits by remote stations that have a sufficient geographic separation from one another.

The method includes the step of receiving at the base station a first incoming wireless signal comprising a plurality of first discrete frequency tones that are orthogonal frequency division multiplexed (OFDM) in a first frequency band from a first remote station at a first geographic location during a first time division multiple access (TDMA) interval. Then the method includes the step of receiving at the base station a second incoming wireless signal comprising a plurality of the first discrete frequency tones that are orthogonal frequency division multiplexed (OFDM) in the first frequency band from a second remote station at a second geographic location during the first time division multiple access (TDMA) interval. Then the method includes the step of spatially despreading the first and second incoming signals received at the base station by using spatial despreading weights. Spatial diversity is provided because the despreading weights enable the base station to steer the receive sensitivity of the base station toward the first remote station and the second remote station, respectively.

Later, the method performs the step of spatially spreading a first and second outgoing wireless signals at the base station by using spatial spreading weights. Then the method includes the step of transmitting at the base station the first outgoing wireless signal comprising a plurality of third discrete frequency tones that are orthogonal frequency division multiplexed (OFDM) in a second frequency band to the first remote station at the first geographic location during a third time division multiple access (TDMA) interval. Then the method includes the step of transmitting at the base station the second outgoing wireless signal comprising a plurality of the third discrete frequency tones that are orthogonal frequency division multiplexed (OFDM) in the second frequency band to the second remote station at the second geographic location during the third time division multiple access (TDMA) interval. Spatial diversity is provided because the spreading weights enable the base station to steer the signals it transmits to the first and second remote stations, respectively.

In another embodiment of the invention, TDD, FDD, TDMA, OFDM, and polarization diversity are combined to enable a base station to efficiently communicate with many remote stations. This is possible because the antenna at the base station and the antennas at the remote stations are designed to distinguish orthogonally polarized signals. Signals exchanged between the base station and a first remote station are polarized in one direction, and signals exchanged between the base station and a second remote station are polarized in an orthogonal direction.

The method includes the step of receiving at the base station a first incoming wireless signal polarized in a first polarization direction comprising a plurality of first discrete frequency tones that are orthogonal frequency division multiplexed (OFDM) in a first frequency band from a first remote station during a first time division multiple access (TDMA) interval. Then the method includes the step of receiving at the base station a second incoming wireless signal polarized in a second polarization direction comprising a plurality of the first discrete frequency tones that are orthogonal frequency division multiplexed (OFDM) in the first frequency band from a second remote station during the first time division multiple access (TDMA) interval. Then the method includes the step of distinguishing the first and second incoming signals received at the base station by detecting the first and second polarization directions. Polarization diversity is provided because signals exchanged between the base station and the first remote station are polarized in one direction, and signals exchanged between the base station and the second remote station are polarized in an orthogonal direction.

Later, the method includes the step of forming a first and second outgoing wireless signals at the base station by polarizing them in the first and second polarization directions, respectively. Then the method includes the step of transmitting at the base station the first outgoing wireless signal polarized in the first polarization direction comprising a plurality of third discrete frequency tones that are orthogonal frequency division multiplexed (OFDM) in a second frequency band to the first remote station at the first geographic location during a third time division multiple access (TDMA) interval. Then the method includes the step of transmitting at the base station the second outgoing wireless signal polarized in the second polarization direction comprising a plurality of the third discrete frequency tones that are orthogonal frequency division multiplexed (OFDM) in the second frequency band to the second remote station at the second geographic location during the third time division multiple access (TDMA) interval. Polarization diversity is provided because signals exchanged between the base station and the first remote station are polarized in one direction, and signals exchanged between the base station and the second remote station are polarized in an orthogonal direction.

In still another embodiment of the invention, TDD, FDD, TDMA, OFDM, spatial diversity, and polarization diversity are combined to enable a base station to efficiently communicate with many remote stations. The resulting invention makes highly efficient use of scarce bandwidth resources to provide good service to a large population of users.

Currently, the invention has advantageous applications in the field of wireless communications, such as cellular communications or personal communications, where bandwidth is scarce compared to the number of the users and their needs. Such applications may be effected in mobile, fixed, or minimally mobile systems. However, the invention may be advantageously applied to other, non-wireless, communications systems as well.

BRIEF DESCRIPTION OF THE DRAWINGS

In the drawings:

FIG. 1.1 is a diagram of PWAN Airlink RF Band Organization

FIG. 1.2 is a diagram of Physical Channels.

FIG. 1.3 is a diagram of PWAN Physical Layer Framing Structure

FIG. 1.4 is a diagram of Details of TDMA Slot Parameters

FIG. 1.5 is a diagram of A PWAN 64 kbit/s data channel

FIG. 1.6 is a diagram of Functional Block Diagram of Base transmitter for a single traffic channel in rate ¾ 16 QAM mode.

FIG. 1.7 is a diagram of The block diagram for Base CLC/BRC transmissions

FIG. 1.8 is a diagram of Gray-coded mapping for the QPSK modulation on the CLC/BRCchannel.

FIG. 1.9 is a diagram of The demultiplexing of a CLC/BRC message on two consequent TDMA frames FIG. 1.10 is a diagram of The Functional Block Diagram of Base receiver for a single traffic channel in rate ¾ 16 QAM mode FIG. 1.11 is a diagram of The Functional Block Diagram of Base receiver for a CAC FIG. 1.12 is a diagram of Functional Block Diagram of RU transmitter for a single traffic channel in rate ¾ 16 QAM mode FIG. 1.13 is a diagram of The block diagram for RU CAC transmissions FIG. 1.14 is a diagram of The demultiplexing of a CAC message on two consequent TDMA frames.

FIG. 1.15 is a diagram of The Functional Block Diagram of RU receiver for a single traffic channel in rate ¾ 16 QAM mode FIG. 1.16 is a diagram of The baseband representation of the RU CLC/BRC receiver FIG. 2.1 is a diagram of Functional Block Diagram of Base transmitter for a single traffic channel in rate ¾ 16 QAM mode.

FIG. 2.2 is a diagram of The Functional Block Diagram of Base receiver for a single traffic channel in rate ¾ 16 QAM mode FIG. 3.1 is a diagram of Forward beam pattern and its effect on RU RSSI FIG. 3.2 is a diagram of Forward beam pattern altered to accomodate incoming RU FIG. 4.1 is a diagram of Processing Diagram FIG. 4.2 is a diagram of Signals as seen at the Base station FIG. 4.3 is a diagram of Delay Compensation in action

DESCRIPTION OF THE PREFERRED EMBODIMENT

Figure 1:
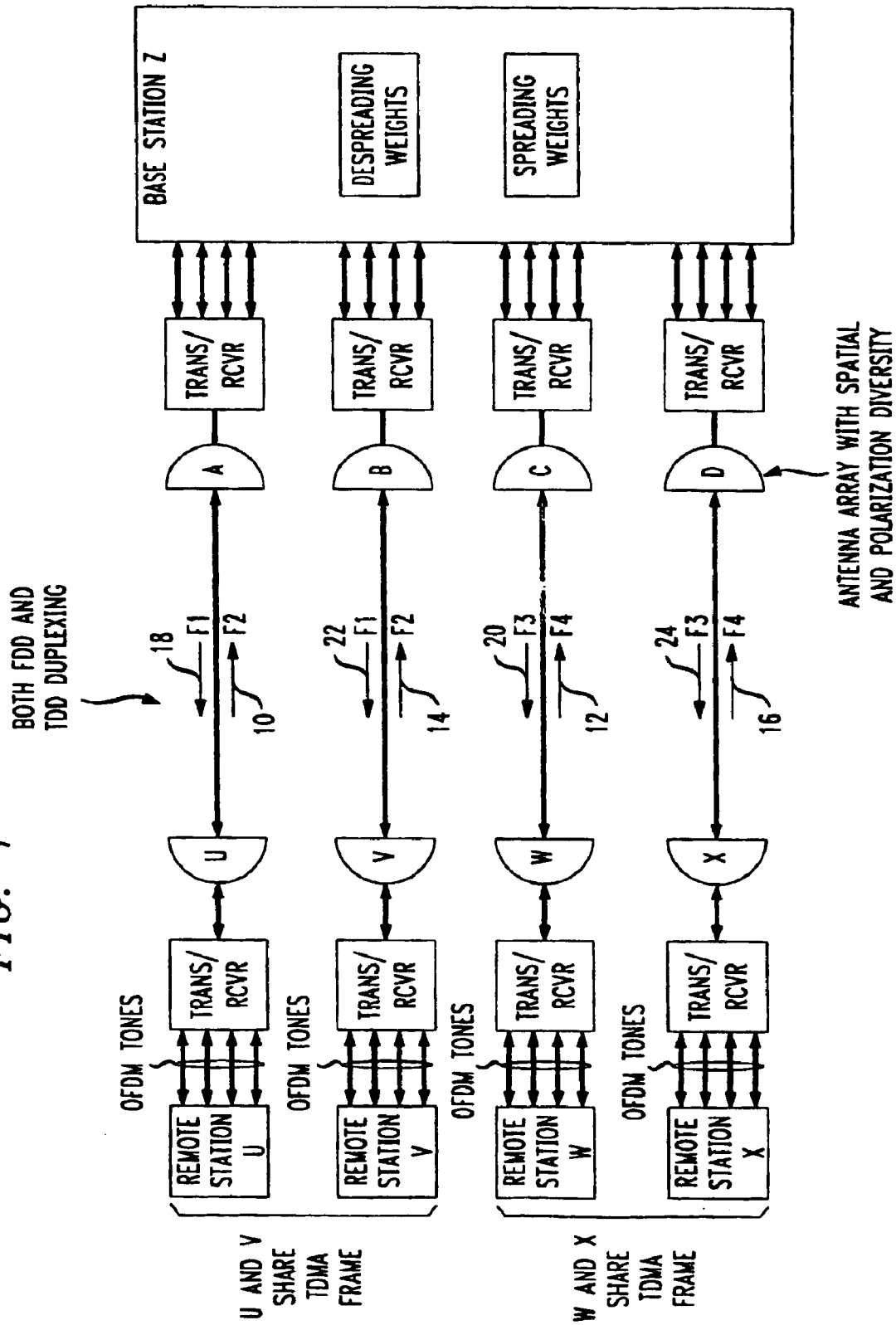
FIG. 1 is an architectural diagram of the PWAN FDD system, including remote stations communicating with a base station.

FIG. 1 is an architectural diagram of the frequency division duplex (FDD) personal wireless access network (PWAN) system, in accordance with the invention. The system employs the method of the invention that combines time division duplex (TDD), frequency division duplex (FDD), time division multiple access (TDMA), orthogonal frequency division multiplexing (OFDM), spatial diversity, and polarization diversity in various unique combinations.

FIG. 1 provides an overview of how the invention combines TDD, FDD, TDMA, and OFDM to enable the base station Z to efficiently communicate with many remote stations U, V, W, and X. The base station Z receives a first incoming wireless signal 10 comprising a plurality of first discrete frequency tones F2 that are orthogonal frequency division multiplexed (OFDM) in a first frequency band from the first remote station U during a first time division multiple access (TDMA) interval. The organization of the TDMA intervals is shown in FIG. 1.5, which is discussed in detail below. Then the base station Z receives a second incoming wireless signal 12 comprising a plurality of second discrete frequency tones F4 that are orthogonal frequency division multiplexed (OFDM) in the first frequency band from a second remote station W during the first time division multiple access (TDMA) interval. The first and second stations U and W accordingly have different sets of discrete frequency tones F2 and F4, that are orthogonal frequency division multiplexed.

The base station Z in FIG. 1, receives a third incoming wireless signal 14 comprising a plurality of the first discrete frequency tones F2 that are orthogonal frequency division multiplexed (OFDM) in the first frequency band from a third remote station V during a second time division multiple access (TDMA) interval. The first and second TDMA intervals are part of the same TDMA frame, as is shown in FIG. 1.5. The first and third stations U and V, accordingly are time division multiplexed by sharing the same set of discrete frequency tones F2 in different TDMA intervals.

The base station Z in FIG. 1, receives a fourth incoming wireless signal 16 comprising a plurality of the second discrete frequency tones F4 that are orthogonal frequency division multiplexed (OFDM) in the first frequency band from a fourth remote station X during the second time division multiple access (TDMA) interval. The second and fourth stations W and X accordingly are time division multiplexed by sharing the same set of discrete frequency tones F4 in different TDMA intervals.

The base station Z in FIG. 1, transmits the first outgoing wireless signal 18 comprising a plurality of third discrete frequency tones F1 that are orthogonal frequency division multiplexed (OFDM) in a second frequency band to the first remote station U during a third time division multiple access (TDMA) interval. The first remote station U and the base station Z accordingly are time division duplexed (TDD) by transmitting their respective signals 10 and 18 at different TDMA intervals. The first, second, third, and fourth TDMA intervals occur at mutually different times, as is shown in FIG. 1.5. In addition, the first remote station U and the base station Z accordingly are frequency division duplexed (FDD) by transmitting their respective signals 10 and 18 on different sets of discrete frequency tones F2 and F1 in different frequency bands.

The base station Z in FIG. 1, transmits the second outgoing wireless signal 20 comprising a plurality of fourth discrete frequency tones F3 that are orthogonal frequency division multiplexed (OFDM) in the second frequency band to the second remote station W during the third time division multiple access (TDMA) interval. The second remote station W and the base station Z accordingly are time division duplexed (TDD) by transmitting their respective signals 12 and 20 at different TDMA intervals. In addition, the second remote station W and the base station Z accordingly are frequency division duplexed (FDD) by transmitting their respective signals 12 and 20 on different sets of discrete frequency tones F4 and F3 in different frequency bands.

The base station Z in FIG. 1, transmits the third outgoing wireless signal 22 comprising the plurality of the third discrete frequency tones F1 that are orthogonal frequency division multiplexed (OFDM) in the second frequency band to the third remote station V during a fourth time division multiple access (TDMA) interval. The third remote station V and the base station Z accordingly are time division duplexed (TDD) by transmitting their respective signals 14 and 22 at different TDMA intervals. In addition, the third remote station V and the base station Z accordingly are frequency division duplexed (FDD) by transmitting their respective signals 14 and 22 on different sets of discrete frequency tones F2 and F1 in different frequency bands.

The base station Z in FIG. 1, transmits the fourth outgoing wireless signal 24 comprising the plurality of the fourth discrete frequency tones F3 that are orthogonal frequency division multiplexed (OFDM) in the second frequency band to the fourth remote station X during the fourth time division multiple access (TDMA) interval. The fourth remote station X and the base station Z accordingly are time division duplexed (TDD) by transmitting their respective signals 16 and 24 at different TDMA intervals. In addition, the fourth remote station X and the base station Z accordingly are frequency division duplexed (FDD) by transmitting their respective signals 16 and 24 on different sets of discrete frequency tones F4 and F3 in different frequency bands.

FIG. 1 shows another embodiment of the invention, wherein TDD, FDD, TDMA, OFDM, and space diversity are combined to enable the base station to efficiently communicate with many remote stations. This is possible because of the multiple element antenna array A, B, C, and D at the base station Z that is controlled by despreading and spreading weights. The spreading weights enable the base station Z to steer the signals it transmits to remote stations U and V that are have a sufficient geographic separation from one another. The despreading weights enable the base station Z to steer the receive sensitivity of the base station toward the sources of signals transmitted by remote stations U and V that have a sufficient geographic separation from one another. To illustrate the effectiveness of spatial diversity in this embodiment, remote stations U and V share the same discrete frequency tones F1 and F2 and the same TDMA interval.

The base station Z in FIG. 1, receives a first incoming wireless signal 10 comprising a plurality of first discrete frequency tones F2 that are orthogonal frequency division multiplexed (OFDM) in a first frequency band from the first remote station U at a first geographic location during a first time division multiple access (TDMA) interval. The base station Z in FIG. 1, receives a second incoming wireless signal 14 comprising a plurality of the first discrete frequency tones F2 that are orthogonal frequency division multiplexed (OFDM) in the first frequency band from the second remote station V at a second geographic location during the same, first time division multiple access (TDMA) interval. The base station Z in FIG. 1, spatially despreads the first and second incoming signals 10 and 14 received at the base station Z by using spatial despreading weights. Spatial diversity is provided because the despreading weights enable the base station Z to steer the receive sensitivity of the base station toward the first remote station U and the second remote station V, respectively.

Later, the base station Z in FIG. 1, spatially spreads a first and second outgoing wireless signals 18 and 22 at the base station by using spatial spreading weights. Then the base station Z in FIG. 1, transmits the first outgoing wireless signal 18 comprising a plurality of third discrete frequency tones F1 that are orthogonal frequency division multiplexed (OFDM) in a second frequency band to the first remote station U at the first geographic location during a third time division multiple access (TDMA) interval. The base station Z in FIG. 1, transmits the second outgoing wireless signal 22 comprising a plurality of the third discrete frequency tones F1 that are orthogonal frequency division multiplexed (OFDM) in the second frequency band to the second remote station V at the second geographic location during the same, third time division multiple access (TDMA) interval. Spatial diversity is provided because the spreading weights enable the base station Z to steer the signals it transmits to the first and second remote stations U and V, respectively.

FIG. 1 shows still another embodiment of the invention, wherein TDD, FDD, TDMA, OFDM, and polarization diversity are combined to enable the base station Z to efficiently communicate with many remote stations U, V, W, and X. This is possible because the antenna A, B, C, or D at the base station Z and the antennas at the remote stations U, V, W, and X are designed to distinguish orthogonally polarized signals. Signals exchanged between the base station Z and a first remote station U are polarized in one direction, and signals exchanged between the base station Z and a second remote station V are polarized in an orthogonal direction. To illustrate the effectiveness of polarization diversity in this embodiment, remote stations U and V share the same discrete frequency tones F1 and F2 and the same TDMA interval.

The base station Z in FIG. 1, receives a first incoming wireless signal 10 polarized in a first polarization direction comprising a plurality of first discrete frequency tones F2 that are orthogonal frequency division multiplexed (OFDM) in a first frequency band from the first remote station U during a first time division multiple access (TDMA) interval. The base station Z in FIG. 1, receives a second incoming wireless signal 14 polarized in a second polarization direction comprising a plurality of the first discrete frequency tones F2 that are orthogonal frequency division multiplexed (OFDM) in the first frequency band from a second remote station V during the first time division multiple access (TDMA) interval. The base station Z in FIG. 1, distinguishes the first and second incoming signals 10 and 14 received at the base station by detecting the first and second polarization directions. Polarization diversity is provided because signals exchanged between the base station Z and the first remote station U are polarized in one direction, and signals exchanged between the base station Z and the second remote station V are polarized in an orthogonal direction.

Later, the base station Z in FIG. 1, forms a first and second outgoing wireless signals 18 and 22 at the base station by polarizing them in the first and second polarization directions, respectively. Then the base station Z in FIG. 1, transmits the first outgoing wireless signal 18 polarized in the first polarization direction comprising a plurality of third discrete frequency tones F1 that are orthogonal frequency division multiplexed (OFDM) in a second frequency band to the first remote station U at the first geographic location during a third time division multiple access (TDMA) interval. Then the base station Z in FIG. 1, transmits the second outgoing wireless signal 22 polarized in the second polarization direction comprising a plurality of the third discrete frequency tones F1 that are orthogonal frequency division multiplexed (OFDM) in the second frequency band to the second remote station V at the second geographic location during the third time division multiple access (TDMA) interval. Polarization diversity is provided because signals exchanged between the base station Z and the first remote station U are polarized in one direction, and signals exchanged between the base station Z and the second remote station V are polarized in an orthogonal direction.

In still a further embodiment of the invention, TDD, FDD, TDMA, OFDM, spatial diversity, and polarization diversity are combined to enable a base station Z to efficiently communicate with many remote stations U, V, W, and X. The resulting invention makes highly efficient use of scarce bandwidth resources to provide good service to a large population of users.

The PWAN system has a total of 3200 discrete tones (carriers) equally spaced in 10 MHZ of available bandwidth in the range of 1850 to 1990 MHZ. The spacing between the tones is 3.125 kHz. The total set of tones are numbered consecutively form 0 to 3199 starting from the lowest frequency tone. The tones are used to carry traffic messages and overhead messages between the base station and the plurality of remote units.

In addition, the PWAN system uses overhead tones to establish synchronization and to pass control information between the base station and the remote units. A Common Link Channel (CLC) is used by the base to transmit control information to the Remote Units. A Common Access Channel (CAC) is used to transmit messages from the Remote Unit to the Base. There is one grouping of tones assigned to each channel. These overhead channels are used in common by all of the remote units when they are exchanging control messages with the base station.

Selected tones within each tone set are designated as pilots distributed throughout the frequency band. Pilot tones carry known data patterns that enable an accurate channel estimation. The series of pilot tones, having known amplitudes and phases, have a known level and are spaced apart by approximately 30 KHz to provide an accurate representation of the channel response (i.e., the amplitude and phase distortion introduced by the communication channel characteristics) over the entire transmission band.

Section 1 PWAN FDD Physical Layer 1.1 Overview

The PWAN FDD system uses a TDMA structure to provide various data rates, and to allow a hybrid FDD/TDD technique at the remote station (RU). FDD is used in the sense that the Base and the RU transmit and receive on two separate bands, and the TDD is used to indicate that for a given connection both the Base and the RU transmit and receive on different TDMA slots. This has no effect on the overall system capacity, and is only a measure for simplifying the RU design; i.e, to ensure that a duplexer is not needed at the RU.

1.2 Frequency Definitions

The total bandwidth allocation for the airlink of the PWAN Network is 10 MHZ in the PCS spectrum which is in the range of 1850 to 1990 MHZ. The total bandwidth is divided into two 5 MHZ bands called the Lower RF Band and the Upper RF Band. The separation between the lowest frequency in the Lower RF Band and the lowest frequency in the Upper RF Band (DF) is 80 MHZ. The base frequency (fbase) for the PWAN Network is defined as the lowest frequency of the Lower RF Band which depends on the specific PCS frequency band. As shown in FIG. 1.1, the PWAN frequency assignment consists of a lower and an upper frequency band.

There are a total of 1600 tones (carriers) equally spaced in each of the 5 MHZ of available bandwidth. The spacing between the tones is 3.125 kHz. The total set of tones are numbered consecutively from 0 to 3199 starting from the lowest frequency tone. Ti is the frequency of the ith tone:

$$T_i = \begin{cases} f_{base} + \frac{\Delta f}{2} + i \cdot \Delta f & 0 \le i \le 1599 \\ f_{base} + \Delta F + \frac{\Delta f}{2} + i \cdot \Delta f & 1600 \le i \le 3199 \end{cases}$$

where fbase is the base frequency, Df is 3.125 kHz, and DF is 80 MHZ. Equivalently, the relationship may be expressed as:

$$T_i = \begin{cases} f_{base} + \left(i + \frac{1}{2}\right) \cdot 3.125 \text{ kHz} & 0 \le i \le 1599 \\ f_{base} + 80000 + \left(i + \frac{1}{2}\right) \cdot 3.125 \text{ kHz} & 1600 \le i \le 3199 \end{cases}$$

The set of 3200 tones is the Tone Space. The tones in the Tone Space are used for two functions: transmission of bearer data, and transmission of overhead data. The tones used for the transmission of bearer data are the Bearer Tones, and the tones dedicated to pilot channels are the Overhead Tones.

Bearer Tones

The bearer tones are divided into 160 Physical Channels which consist of 80 Forward Physical Channels (FPC) and 80 reverse Physical Channels (RPC). Some of these channels are unavailable because they must be used as a guard-band between PWAN and other services in the neighboring bands. Each of the Physical channels contains 18 Tones as shown in FIG. 1.2. The mapping of tones into the ith FPCi, and the ith RPCi is shown in Table 1.1 and Table 1.2 respectively.

Overhead Tones

The overhead tones are used for the following channels:

Forward Control Channel: FCC

Reverse Control Channel: RCC

These channels may use any set of the 160 overhead tones. The following equation shows the mapping of overhead tones:

$FCC(i) = T_{10i}, 0 \le i \le 159$ $RCC(i) = T_{1600+10i}, 0 \le i \le 159$ 1.3 Timing and Framing Definitions The framing structure is shown in FIG. 1.3. The smallest unit of time shown in this figure is a TDMA Slot. 8 TDMA slots constitute a TDMA frame. 16 TDMA frames make a multiframe, and 32 multiframes make a superframe. Frame synchronization is performed at the superframe level. The multiframe boundary is determined from the superframe boundary.

As shown in FIG. 1.4, in every TDMA slot, there is a transmission burst and a guard time. Data is transmitted in each burst using multiple tones. The burst duration is Tburst. A guard period of duration Tguard is inserted after each burst. Table 1.3 shows the values of the TDMA slot parameters.

1.4 Bearer Channel Definitions

A PWAN bearer channel uses a single physical channel with 18 tones separated by 3.125 kHz. The bandwidth occupancy of a bearer channel is therefore 56.25 kHz. Bearer channels may be used to carry traffic or control (access and broadcast) information.

The PWAN traffic channels may carry between 16 kbit/s to 64 kbit/s of information depending on the number of TDMA slots assigned to them. A 16 kbit/s PWAN traffic channel uses one TDMA slot per TDMA frame, a 32 kbit/s channel uses 2 TDMA slots per frame, and a 64 kbit/s channel uses 4 TMDA slots per TDMA frame, as shown in FIG. 1.5. FIG. 1.5 assumes that there is no space division multiple access. However, it may be possible to support more than one user on a given TDMA slot, if the users are geographically separated and the transceiver can take advantage of that separation to form spatial beams.

1.5 Transmission Formats 1.5.1 Traffic Channel Modulation Modes

In order to increase the overall capacity of the system, and to ensure viable deployment of the system in various interference levels, propagation environments, and possible required transmission ranges, PWAN may use various coded modulation schemes (rates). Under benign channel conditions, an efficient high rate code may be used. If conditions get worse, a low rate, coded modulation scheme is used. This is especially important considering the high availability requirements for a wireless local loop system.

As an example, we consider the use of a bandwidth efficient rate ¾ 16 QAM scheme. Lower rate codes can also be used.

1.5.2 Base Transmission Format 1.5.2.1 Base Transmitter Functional Block Diagram 1.5.2.1.1 Traffic Channels (An Example)

The Base transmits information to multiple RUs in its cell. This section describes the transmission formats for a 16 kbit/s to 64 kbit/s traffic channel, together with a 1 kbit/s to 4 kbit/s Link Control Channel (LCC) from the Base to a single RU. The 16 kbit/s link is achieved by assigning one TDMA slot per TDMA frame. The TDMA frame is 3 ms long, thus the effective data rate is 16 kbit/s times the number of TDMA slots per TDMA frame. For higher data rates, the process described in this section is repeated in every applicable TDMA slot. For example, for the 64 kbit/s link, 4 TDMA slots per frame need to be assigned; in which case, the process described here is repeated 4 times within a given TDMA frame. The block diagram for Base transmitter in FIG. 1.6 shows the processing of data for one TDMA slot.

The Binary Source delivers 48 bits of data in one TDMA slot. The bit to octal conversion block converts the binary sequence into a sequence of 3-bit symbols. The symbol sequence is converted into a 16 element vector. One symbol from the Link Control Channel (LCC) is added to form a 17 element vector.

The vector is trellis encoded. The trellis encoding starts with the most significant symbol (first element of the vector) and is continued sequentially until the last element of the vector (the LCC symbol). The output of the trellis encoder is a 17 element vector where each element is a signal within the set of 16QAM constellation signals.

A known pilot symbol is added to form an 18 element vector, with the pilot as the first element of this vector.

The resulting vector is to be transmitted over 8 different antennas. The elements of the vector are weighted according to the antenna element through which they are transmitted. The description of how these weights can be derived is found in Section 2.

The 18 symbols destined for each antenna are then placed in the inverse DFT frequency bins (corresponding to the physical channel) where they are converted into the time domain. The symbols are mapped into tones on the ith forward physical channel FPCi. The mapping of the common link channel (CLC)/broadcast channel (BRC) symbols into tones is shown in Table 1-4. The digital samples are converted to analog, RF converted and sent to the corresponding antenna element (0 to 7) for transmission over the air.

This process is repeated from the start for the next 48 bits of binary data transmitted in the next applicable TDMA slot. FIG. 1.6 is a Functional Block Diagram of Base transmitter for a single traffic channel in rate ¾ 16 QAM mode.

1.5.2.1.2 CLC/BRC Channels

The block diagram for the CLC/BRC transmissions is shown in FIG. 1.7. The generation of CLC/BRC information is represented by a binary source that generates 72 bits of data for every CLC/BRC transmission. The 72 bit sequence is RS encoded using a shortened Reed Solomon RS (63, 35) code to generate a 40 RS symbol sequence (or equivalently a 240 bit sequence).

The 240 bit sequence is then quadrature phase shift key (QPSK) modulated where every two bits are mapped onto a constellation point according to the Gray mapping shown in FIG. 1.8.

The output of the QPSK modulator is a 120 symbol sequence (S0–S119). The QPSK symbols are interleaved with 24 pilot symbols (P0–P23), where for every 5 data symbols, a pilot is inserted. This results in a 144 symbol sequence. The sequence is then time demultiplexed into 8, 18 element vectors for transmission over 8 TDMA slots (in two TDMA frames) as shown in FIG. 1.9.

A given 18 element vector is transmitted over 8 different antennas. The elements of the vector are weighted according to the antenna element through which they are transmitted. The description of how these weights can be derived is found in Section 2.

The 18 symbols destined for each antenna are then placed in the inverse DFT frequency bins (corresponding to the physical channel) where they are converted into the time domain. The digital samples are converted to analog, RF converted and sent to the corresponding antenna element (0 to 7) for transmission over the air. Table 1.4 shows a mapping of symbols onto tones for CLC/BRC transmissions on the ith physical channel.

1.5.2.2 Base Receiver Functional Block Diagram 1.5.2.2.1 Traffic Channels (Example)

FIG. 1.10 shows the block diagram of the Base receiver for a traffic channel. During a given TDMA slot, and on a given physical channel, the Base receives signals on all its 8 antennas. The signals are down-converted, digitally sampled, and transformed back into frequency domain using Discrete Fourier Transform (DFT). For a particular traffic channel, the appropriate tones are selected using a demultiplexer. The tones from all the antennas are then sent to a despreader. The despreader weights all the tones from a given antenna by a given weight which can be calculated as described in Section 2, and then adds all the tones from different antennas (addition of 8, 18 element vectors). The resulting 18 element vector is then sent to an equalizer where each element of the vector is multiplied by a phase correction factor, and the pilot symbol is stripped off the sequence. The remaining 17 symbols are sent to the trellis decoder which delivers 16 symbols (48 bits) of traffic data, and 1 symbol (3 bits) of LCC data.

This process is repeated from the start for the next 48 bits of binary data transmitted in the next applicable TDMA slot. FIG. 1.10 is a Functional Block Diagram of Base receiver for a single traffic channel in rate ¾ 16 QAM mode.

1.5.2.2.2 Common Access Channels (CACs)

FIG. 1.11 shows the block diagram of the Base receiver for a CAC. During a given TDMA slot, and on a given physical channel, the Base receives signals on all its 8 antennas. The signals are down-converted, digitally sampled, and transformed back into frequency domain using Discrete Fourier Transform (DFT). For a particular CAC channel, the appropriate tones are selected using a demultiplexer. The tones from all the antennas are then sent to a despreader. The despreader weights all the tones from a given antenna by a given weight which can be calculated as described in Section 2, and then adds all the tones from different antennas (addition of 8, 18 element vectors). The resulting 18 tones are sent to an equalizer where each tone is multiplied by a phase correction factor, and the 9 pilot symbols are stripped off the sequence. The 9 element vector is then QPSK demodulated. Since each element of the vector is a QPSK symbol representing two bits of information, the demodulator outputs 18 bits of information.

The time multiplexer collects the symbols received in 8 consecutive TDMA slots to form 144 bits of RS encoded information hence forming a 24 RS symbol block (every RS symbol is 6 bits long). The RS block is then decoded to produce 12 RS symbols or 72 bits of the original CAC information transmitted from the RU. FIG. 1.11 is a Functional Block Diagram of Base receiver for a CAC.

1.5.2.3 RU Transmitter Functional Block Diagram 1.5.2.3.1 Traffic Channels

The RU transmits information to the single Base in its cell. This section describes the transmission formats for a 16 kbit/s to 64 kbit/s traffic channel, together with a 1 kbit/s to 4 kbit/s Link Control Channel (LCC) from an RU to its Base. The 16 kbit/s link is achieved by assigning one TDMA slot per frame. For higher data rates, the process described in this section is repeated in every applicable TDMA slot. For example, for the 64 kbit/s link, 4 TDMA slots per frame need to be assigned.

The block diagram for the RU transmitter in FIG. 1.12 shows the processing of data for one TDMA slot.

The Binary Source delivers 48 bits of data in one TDMA slot. The bit to octal conversion block converts the binary sequence into a sequence of 3-bit symbols. The symbol sequence is converted into a 16 element vector. One symbol from the Link Control Channel (LCC) is then added to form a 17 element vector.

The vector is trellis encoded. The output of the trellis encoder is another 17 element vector where each element is a signal within the set of 16QAM constellation signals.

A known pilot symbol is then added to form an 18 element vector. The 18 elements are placed in the inverse DFT frequency bins (corresponding to the physical channel) where they are converted into the time domain. The digital samples are converted to analog, RF converted and sent to antenna for transmission over the air.

This process is repeated from the start for the next 48 bits of binary data transmitted in the next applicable TDMA slot. FIG. 1.12 is a Functional Block Diagram of RU transmitter for a single traffic channel in rate ¾ 16 QAM mode.

1.5.2.3.2 Common Access Channels (CACs)

The block diagram for the RU CAC transmissions is shown in FIG. 1.13. The generation of CAC information is represented by a binary source that generates 72 bits of data for every CAC transmission. The 72 bit sequence is RS encoded using a shortened Reed Solomon RS (63, 35) code to generate a 24 RS symbol sequence (or equivalently a 114 bit sequence).

The 114 bit sequence is QPSK modulated where every two bits are mapped onto a constellation point according to Gray mapping. The output of the QPSK modulator is therefore a 72 symbol sequence (S0–S71). The QPSK symbols are interleaved with 72 known pilot symbols (P0–P71), where for every data symbol, a pilot is inserted. This results in a 144 symbol sequence. The sequence is time demultiplexed into 8, 18 element vectors for transmission over 8 TDMA slots (in two TDMA frames) as shown in FIG. 1.14. Table 1.5 Mapping of symbols onto tones for CAC transmissions on the ith reverse physical channel During each TDMA slot, the 18 symbols are placed in the DFT frequency bins (corresponding to the physical channel) where they are converted into the time domain. The digital samples are converted to analog, RF converted and sent to the antenna for transmission over the air. FIG. 1.14 shows the demultiplexing of a CAC message on two consequent TDMA frames.

1.5.2.4 RU Receiver Functional Block Diagram
1.5.2.4.1 Traffic Channels

FIG. 1.15 shows the block diagram of the RU receiver. During a given TDMA slot, and on a given physical channel, the RU receives a signal on its antenna. The signals are down-converted, digitally sampled, and transformed back into frequency domain using Discrete Fourier Transform (DFT). For a particular traffic channel, the appropriate tones are selected using a demultiplexer. The 18 tones are sent to an equalizer where each tone is multiplied by a phase correction factor, and the pilot symbol is stripped off the sequence. The remaining 17 symbols are sent to the trellis decoder which delivers 16 symbols (48 bits) of traffic data, and 1 symbol (3 bits) of LCC data.

FIG. 1.15 shows the Functional Block Diagram of RU receiver for a single traffic channel in rate ¾ 16 QAM mode.

1.5.2.4.2 Common Link and Broadcast Channels (CLC/BRCs)

FIG. 1.16 is a block diagram representation of baseband processing in the CLC/BRC receiver. During a given TDMA slot, on a given physical channels used for CLC/BRC transmission, the RU receives a time domain signal through its antenna. The signal is down-converted, digitally sampled, and transformed back into frequency domain using Discrete Fourier Transform (DFT). The appropriate tones for the CLC/BRC are selected using a demultiplexer. The 18 tones are sent to an equalizer where each tone is multiplied by a phase correction factor, and the 3 pilot symbols are then stripped off. The remaining 15 elements are then QPSK demodulated. Hence, the demodulator outputs 30 bits of information.

The time multiplexer collects the data in 8 consecutive TDMA slots to form 240 bits of RS encoded information hence forming a 40 RS symbol block (every RS symbol is 6 bits long). The RS block is then decoded to produce 12 RS symbols or 72 bits of the original CLC/BRC information transmitted from the Base.

Section 2 PWAN FDD Spatial Processing

Introduction

Spatial processing is incorporated into the PWAN physical layer to provide enhanced capacity and an improved grade of service. These are achieved through spatial isolation for frequency reuse and through the suppression of co-channel interferers. In a frequency division duplex (FDD) system where the transmit and receive bands are widely separated in frequency, reciprocity in the channel is not achievable. Therefore, different beamforming strategies are needed on the forward and reverse channels.

This section specifically describes those functions required to implement spatial processing at the PWAN Base station. Spatial processing at the Remote Unit is optional and offers a potential means of gaining spatial degrees of freedom for further increases in capacity.

The primary functions present in any beamforming system will be described for both the forward and reverse links. They include the application of the beamforming weights, weight computation, adaptation, and incorporation of the reference pilots.

2.1 Narrowband Assumption

It is first important to address one of the primary assumptions inherent in any beamforming system; whether it is narrowband or broadband in frequency. For the PWAN system, it is assumed that all beamforming is narrowband. It is necessary to define the system as narrowband at the outset to be sure that the frequency responses at different array elements match closely and that received spatial samples are sufficiently correlated from one end of the array to the next.

This assumption can be examined analytically in the context of the observation time-bandwidth product for the Base station antenna aperture. It can also be tested through observation of the mismatch present in the beam pattern across the frequency band of interest.

The observation-time interval for an antenna aperture is defined as the time required for a plane waveform to travel completely across the antenna aperture. This is a function of the signal angle-of-arrival. The observation time-bandwidth product (TBWP) is the product of the observation interval and the signal bandwidth. For an array to be considered narrowband, the TBWP should be much less than 1 for all angles of arrival.

A quick calculation of the TBWP for a linear aperture with 8 element uniform spacing should give a bound on this TBWP for PWAN, since this would be the limiting case on the observation interval for a uniformly spaced array. Equation 2.1 and Equation 2.2 describe this calculation, where Td is the observation time interval, BW is the signal bandwidth (112.5 kHz), N is the number of array elements (8), and c is the speed of light.

$$Td = (\text{Element Spacing} * \sin(\text{angle-of-arrival}))/c) * (N-1) = (2.63e-10)*(8-1) = 1.84e-09 \quad (Eq\ 2.1)$$

$$TBWP = 1.84e-09 * BW = 1.84e-09 * 112.5e03 = 2.07e-04\ TBWP = 2.07e-04 << 1 \quad (Eq\ 2.2)$$

This calculation was done for the maximum angle-of-arrival off boresight (at endfire) of 90 degrees for the maximum observation interval. As can be seen from equation 1.2, the TBWP is much less than one for the maximum delay (all other angles would have smaller TBWP) so the narrowband assumption holds.

This assumption was also investigated for the linear array through simulations with the result that mismatch in the beampatterns over this bandwidth had negligible mean-square error (MSE); again validating the narrowband assumption.

2.2 Far Field Assumption

Another important assumption inherent in the PWAN beamforming system is the far-field assumption. This states that all beamforming functions are designed for waveforms received from the far-field (>~4 meters) as opposed to the near field (>~4 meters). This allows the designer to treat any propagating waveform impinging on the antenna aperture as a planar wavefront, thus implying that propagation of the signal between two antenna elements can be characterized as pure delay. The signal is assumed to have equal intensity at any point on the planar wavefront.

2.3 Forward Channel

On the forward link, from the Base to the RU, beamforming is employed to provide isolation between spatially separated RUs. At transmission from the Base, beamforming is based on direction-of-arrival estimates derived from received RU transmissions. At the RU receiver, spatial isolation is provided by data combining at the antenna aperture itself for a continuous fixed beampatterns.

2.3.1 Base Transmitter

A functional representation of a single traffic channel for the Base transmitter is presented in FIG. 2.1. This section will address those components of the Base transmitter that directly implement the spatial processing functions; the Spreader block shaded in FIG. 2.1 and the antenna array. FIG. 2.1 is a Functional Block Diagram of Base transmitter for a single traffic channel in rate ¾ 16 QAM mode.

2.3.1.1 Antenna Array

The antenna array for the Base transmitter consists of N sensors that transmit spatially weighted signals from each array element. This array is configured in a hemispherical geometry with either uniform or non-uniform element spacing.

2.3.1.2 Weight Application

Beamforming in the forward direction is achieved by applying a complex weight matrix, W, composed of weight vectors corresponding to each user, such that the transmitted signal is reinforced in the direction of the desired RU(s) and attenuated for all other transmit directions. This weight application is described in the following equation.

$$X = WY \quad (Eq\ 2.3)$$

Equation 2.3 represents a matrix multiplication of the baseband tone data, Y, by the weight matrix, W, to produce the tone data to be modulated and transmitted, X.

2.3.1.3 Weight Derivation

The Spreader block within the Base transmitter provides the matrix of spatial weights, W, for application to the tone data to be transmitted. This matrix may be derived by one of several methods; from data-independent fixed beam weights derived from the spatial separation of the antenna array aperture, by real-time, adaptive, computation of statistically optimum beam weights derived from second order statistics of the data received over the antenna array aperture, or by receiving either type of weight through an interface from another Base subsystem.

Each method of weight derivation implies certain advantages with regard to spatial isolation, co-channel interference rejection, and system processing complexity.

Data independent fixed beam weights place the least real-time computational burden on the baseband subsystem, since these weights can be pre-calculated and tabularized for look-up on a per call basis at real-time. Data-independent weights provide spatial isolation between downlink transmissions for spatial division multiple access (SDMA) but, will not steer nulls for direct suppression of co-channel interferers. However, suppression of these interferers is inherent in the spatial isolation provided by the mainlobe-to-sidelobe ratio, but the advantages (spatial resolution and increased attenuation) of adaptively steering nulls directly at a co-channel interferers are not available.

Statistically optimum beamforming weights provide direct suppression of co-channel interferers, but require increased processing power and cause increased latency due to convergence times in the weight calculation. It should also be noted that in FDD systems, direction of arrival (DOA) estimation will not provide the transmit beamformer with accurate estimates of multipath components due to the independence of channel effects over the wide frequency separation of the forward and reverse bands. This implies that the transmit beamformer will only be able to null fixed line of sight (LOS) transmission from interfering RUs. Another significant benefit to this approach, however, is the increased resolution of the mainbeam, thus providing enhanced spatial resolution over data-independent weights.

2.3.1.4 Weight Update

The weight matrix, W, must be periodically updated. This update is required to track changes in the forward link channel as well as individual links continuously being torn down and set up over that channel. For data independent weights, channel tracking does not apply and the weight update is based on a per call basis. For statistically optimum weights, the update interval is based on the rate of adaptation derived from the channel statistics (time-bandwidth product and channel statistically.)

2.3.1.5 Reference Signal

The Base will transmit reference link maintenance pilots (LMPs) to provide a phase reference for coherent demodulation and an estimate of the desired signal for beamform error estimation. Reference signals are transmitted on both the forward link and on the reverse link. This allows the Base to make a measurement of mean-square error (MSE) for use in deriving an optimal beamform solution on the reverse link without relying on direction-of-arrival estimation.

2.3.1.6 Direction-of-Arrival Estimation

Apriori knowledge of the angle-of-arrival for RU transmissions is required to steer transmit beams at the desired signals on a call-by-call basis. This information must be gathered through DOA estimation techniques.

2.3.2 RU Receiver

RU baseband spatial processing techniques perform spatial processing at the array aperture to form a continuous beam.

2.4 Reverse Channel

On the reverse link, from the RU to the Base, beamforming is employed to provide isolation between spatially separated RUs and to provide suppression of co-channel interferers. On this link, no apriori knowledge of the angle-of-arrival of RU transmissions is required but, rather, reference signal adaptive beamforming is employed.

2.4.1 Base Receiver

A functional representation of a single traffic channel for the Base receiver is presented in FIG. 2.2. This section addresses those components of the Base receiver that directly implement the spatial processing functions; the Despreader block shaded in FIG. 2.2 and the antenna array. FIG. 2.2 shows the Functional Block Diagram of Base receiver for a single traffic channel in rate ¾ 16 QAM mode.

2.4.1.1 Antenna Array

The antenna array for the Base receiver consists of N sensors that sample waveforms impinging on the array aperture at each array element. This array is configured in a hemispherical geometry with either uniform or non-uniform element spacing.

2.4.1.2 Weight Application

Spatial processing in the reverse direction is achieved by applying a complex weight matrix, W, composed of weight vectors corresponding to each user, such that the received signal is reinforced in the direction of the desired RU and attenuated in all other directions. This weight application is described in the following equation.

$$Y = WX \qquad (Eq\ 2.4)$$

Equation 2.4 represents a matrix multiplication of the baseband tone data, X, by the weight matrix, W, to produce the despread tone data, Y.

2.4.1.3 Weight Derivation

The Depreader block within the Base receiver provides the matrix of spatial weights, W, for application to the received data. This matrix may be derived by one of several methods; from data-independent fixed beam weights derived from the spatial separation of the antenna array aperture, by real-time, adaptive, computation of statistically optimum beam weights derived from second-order statistics received over the antenna array aperture, or by receiving either type of weight through an interface from another Base subsystem.

Each method of weight derivation implies certain advantages with regard to spatial isolation, co-channel interference rejection, and system processing complexity.

Data independent fixed beam weights place the least real-time computational burden on the baseband subsystem, since these weights can be pre-calculated and tabularized for look-up on a per call basis at real-time. Data-independent weights provide spatial isolation between uplink transmissions for spatial division multiple access (SDMA) but, do not steer nulls for direct suppression of co-channel interferers, however, suppression of these interferers is inherent in the spatial isolation provided by the mainlobe-to-sidelobe ratio, but the advantages (spatial resolution and increased attenuation) of adaptively steering nulls directly at a co-channel interferers is not available.

Statistically optimum beamforming weights provide direct suppression of co-channel interferers, but require increased processing power and cause increased latency due to convergence times in the weight calculation.

2.4.1.4 Weight Update

The weight matrix, W, must be periodically updated. This update is required to track changes in the reverse link channel as well as individual links continuously being torn down and set up over the channel. For data independent weights, channel tracking does not apply and the weight update is based on a per call basis. For statistically optimum weights, the update interval is based on the rate of adaptation derived from the channel statistics (time-bandwidth product and channel stationary.)

2.4.1.5 Direction-of-Arrival Estimation

On the reverse link, direction-of-arrival estimation is performed on the received data set for application on the forward link. This information allows the Base transmit beamformer to steer beams at the intended RU and, for statistically optimum weights, nulls at interfering RUs. For a wireless local loop system such as PWAN, no tracking of the angle-of-arrival estimate is necessary since the source RUs are fixed in space. As mentioned previously, these angle-of-arrival estimates have the disadvantage of being independent across PCS bands so that they will not track multipath effects.

2.4.1.6 Reference Pilots

The Base will transmit reference link maintenance pilots (LMPs) to provide a phase reference for coherent demodulation and an estimate of the desired signal for beamform error estimation. Reference signals are transmitted on both the forward link and on the reverse link. This allows the Base to make a measurement of mean-square error (MSE) for use in deriving an optimal beamform solution on the reverse link without relying on direction-of-arrival estimation.

2.4.2 RU Transmitter

RU baseband spatial processing techniques RU perform spatial processing at the array aperture to form a continuous beam.

Section 3 PWAN Channel Allocation

Introduction

When a traffic channel is to be established for an RU the base must allocate a channel on which the RU can meet the required grade of service.

3.1 RU Capability

The channel allocation algorithm needs to know information concerning the capabilities of each active and new RU. If future equipments operate over different IF bandwidths then the channel allocation algorithm needs to know what each equipment can support.

In the first generation of PWAN the RU's support a 1 MHz operating bandwidth. This allows operation over any of 16 channels. When an RU is identified by its RUID the base searches a data base containing the required information about the RU for the channel allocation algorithm e.g. frequency (IF), bandwidth (BW), number of bearer (B) channels supported, type(s) of voice coding supported, etc.

3.2 Direction of Arrival (DOA)

Since the system is dependent on SDMA for increasing capacity, a very important parameter is the DOA for each RU. The channel allocation algorithm needs to know the DOA of every RU involved in an active call and the DOAs of any new RUs.

Initially a channel allocation algorithm could be devised which simply maximizes the separation of the DOA between a new RU and the other active RU's on some number of available clusters. However, as the number of users on the system increases, there needs to be more information incorporated into the channel selection than just DOA.

There are several candidate algorithms for DOA estimation:
coherent signal-subspace (CSS) with spatial interpolation
SS-DOA
MUSIC
ESPRIT

3.3 Channel Measurements

In order for the best channel to be chosen, the RUs must make measurements on some number of channels and report the results to the base station for use in selecting the best channel for an RU when a link is established. These measurements include RSSI and SINR. Table 3.1 shows a gross look at how received signal strength indicator (RSSI) and signal to interference ratio (SINR) information could be used to assign channels to incoming RUs.

It is clear that the lower the RSSI on a channel the better a candidate it would be since there is little energy directed at that RU on that channel by any base. However an RU could measure energy from a forward antenna pattern sidelobe as shown in FIG. 3.1. From FIG. 3.1 it is seen that the incoming RU could be accommodated if the serving base altered its beam pattern for the established RU to steer a null at the incoming RU. Likewise the beam pattern for the incoming RU would have a null steered at the established RU. This situation is shown in FIG. 3.2. FIG. 3.1 shows Forward beam pattern and its effect on RU RSSI. FIG. 3.2 shows Forward beam pattern altered to accomodate incoming RU.

With only RSSI information it is impossible to distinguish between the beam sidelobe of the serving base and interference from surrounding bases. To help decide between intercell and intracell energy the SINR measurements are used. A low SINR value indicates high levels of noise and interference on the channel. A high SINR value indicates a clear signal from the serving base. So for the situation shown in FIG. 3.1 the RU would report significant RSSI with fairy high SINR. If the DOA of the incoming RU was far enough away from the established RU then there is enough information to know that the forward beam pattern can be squinted to accomodate the incoming RU on that channel as shown in FIG. 3.2.

As a first cut it seems that the three pieces of data can be combined into a channel candidacy assessment factor (CAF). The three desirable situations are: large separation in DOA, small RSSI, and high SINR. So an equation to quantify the candidacy of channel n is $$CAF(n) = fDOA(n) + fRSSI(n) - fSINR(n) \quad \text{(Eq 3.1)}$$

$$fDOA(n) = a1(180 - \min(|DOAe(k) - DOAi|)) \text{ for all } k \quad \text{(Eq 3.2)}$$

$$fRSSI(n) = a2(133 + RSSI(n)) \quad \text{(Eq 3.3)}$$

$$fSINR(n) = a3(SINRRU(n) + SINRBase(n)) \quad \text{(Eq 3.4)}$$

A lower value of CAF indicates a better candidacy for that channel. An ideal channel would have a CAF of 0. In Equation 3.2 through Equation 3.4 a1, a2, and a3 are scale factors for the three terms. The first term of Equation 3.1 assesses the DOA information. The maximum separation possible is 180 degrees. So a larger difference in DOA will cause the first term to be smaller. The second term of Equation 3.1 assesses the RSSI measurement. The noise floor of the receiver is −133 dBm. This is the ideal measurement indicating no activity on that channel, so any value greater than −133 dBm biases the CAF away from ideal. The third term of Equation 3.1 includes the effects of channel SINR. A larger value of SINRRU gives a better CAF since it means the energy seen by the RU is from the serving base. Likewise a larger SINRBase means there is less interference from RUs in other cells on that channel.

EXAMPLE a1=a2=1, a3=½

An RU requests a traffic channel from its serving cell. It reports the following measurements as part of traffic establishment:

$RSSI(1) = -95$ dBm, $SINRRU(1) = 9.3$ dB $RSSI(2) = -95$ dBm, $SINRRU(2) = 4.5$ dB.

The serving base measures the incoming RU's DOA as 42 degrees. There is an RU on channel 1 at 127 degree, and one on channel 2 at 133 degrees. Also, SINRBase(1)=12 dB, and SINRBase(2)=13 dB.

$CAF(1) = (180 - |127 - 42|) + (133 - 95) - 0.5(9.3 + 12) = 122.35$ $CAF(2) = (180 - |133 - 42|) + (133 - 95) - 0.5(4.5 + 13) = 118.25$

The RU measured the same RSSI on both channels. The DOA of the existing RU on channel 1 was slightly better than the DOA of the existing RU on channel 2. The base's SINR measurement for channel 1 was slightly better than the measurement for channel 2. The measurement that made the biggest difference in this case was the RU SINR.

In order to effectively measure SINR, the RUs and base must have a sense of whether or not a signal belongs to a given cell. Without any such mechanisms a SINR measurement would be the same for a signal of a given RSSI level from the serving base as it would be for a signal from a neighboring base with the same RSSI value. A way to differentiate signals in different cells is to encode the reference pilots on the traffic channels with different phases or sequence of phases which would be derived from the Base Station Offset Code.

3.4 Procedure

1. In idle mode each RU measures the RSSI and SINR of each channel it could potentially operate on and orders them from subjective best to subjective worst.

2. There is a parameter, meas_rpts, which is sent on the broadcast channel of each base stating how many channel measurements an RU will send to the base when a traffic connection is to be established.

3. When a traffic connection is to be established the RU sends the best meas_rpts channel measurements to the base on the SCAC channel.

4. The base uses the channel measurements sent by the RU to compute a CAF for each of the candidate channels in the set sent by the RU.

5. If one or more of the channels in the set which was sent by the RU produces an acceptable CAF then the channel with the best CAF is chosen.

6. If none of the channels in the set which was sent by the RU produces an acceptable CAF then the base requests the next best set of meas_rpts measurements from the RU.

7. The base repeats steps 4 through 6 until either an acceptable channel is found and is then used or the list of candidate channels is exhausted at which point the call is blocked.

Section 4 PWAN Synchronization

Introduction

The RU synchronization and Base delay compensation algorithms are discussed. Both algorithms aim to achieve synchronization in either time (Base delay compensation), or in time and frequency (RU synchronization).

4.1 RU Synchronization

When the remote unit (RU) is initialized and begins receiving transmissions from its Base, the time of arrival of the waveform is unknown. Also, the RU Signal Pilots (RSPs) will not likely be within the prescribed FFT bins because the Base oscillator and the RU oscillator are operating at slightly different frequencies. The purpose of the synchronization algorithm is to align the RU processing window, or receive gate, with the waveform, and to adjust the RU reference oscillator (VCXO) to operate at the same frequency as the Base oscillator.

Synchronization is presented as a two-step process. First, acquisition of the synchronization waveform in both time and frequency must occur. The RU receive gate is adjusted to contain most of the signal energy, and the RU VCXO is adjusted to eliminate most of the RU-Base frequency disparity. Driving the residual frequency offset to zero and maintaining an average frequency offset of zero requires a robust method of frequency estimation, continuously running during RU operation. Once the frequency error is eliminated, the RU is said to be frequency-locked to the base. Maintaining the zero frequency error is the function of the frequency-tracking step, which runs continuously in the background. The phase-locked loop (PLL) is capable of tracking time-varying phase immersed in noise, and is thus an effective frequency estimator for tracking RU-Base frequency errors. In fact, the PLL is the implementation of the optimal; i.e., maximum likelihood, carrier phase estimator.

The only requirement for the algorithm is that the system is based on orthogonal frequency division multiplexing (OFDM), with even spacing between tones.

4.1.1 Time Required for Synchronization

RU synchronization is performed at initialization of the RU, or whenever synchronization is lost. The time requirements for achieving initial synchronization are not as critical as for the case when the RU has to reestablish frequency lock after sleep mode. RU battery life is the critical issue in keeping resync time at a minimum.

Time and frequency bandwidth are the resources that determine how long it takes to achieve frequency lock. Channel effects and noise must be averaged out in the estimation of time delay and frequency offsets; one can either average over time, or over frequency, to mitigate these effects. A balance must be struck between use of the available bandwidth and the time constraints determined by the system requirements.

4.1.2 RU Synchronization Implementation

4.1.2.1 Synchronization Pilots

The proposed synchronization algorithm does not assume a particular model for the data channel configuration. That is, no particular tone mapping of the pilot waveforms, or RU signal pilots (RSPs), is assumed. The RSPs can comprise the overhead tones of a data channel, be in a separate synchronization channel, or constitute part of a message framing structure.

4.1.2.2 Functional Description

The ultimate objective of synchronization is to achieve time and frequency lock for demodulation of data. Precise alignment of the RU receive time gate with the data burst, and frequency lock of the RU oscillator with the Base is required for orthogonality of the FFT bin data, and hence, for reliable demodulation. Synchronization relies upon a multiple step procedure in which coarse adjustments are made in time and frequency, then fine adjustments are made in time and frequency to system specifications. The steps, labeled coarse time alignment, coarse frequency alignment, fine time alignment, and frequency tracking, are outlined below.

1. Coarse Time Alignment. The waveform must be within the receive gate for determination of the RSPs in frequency. Coarse time alignment is achieved with a filter matched to the frequency-offset waveform.

2. Coarse Frequency Alignment. Outputs from a bank of matched filters in the frequency domain yield a coarse estimate of the frequency offset. The RU VCXO is adjusted to bring the RU oscillator within a specified frequency tolerance of the Base oscillator.

3. Frequency Track. A phase-locked loop (PLL) drives the residual frequency offset to zero and continuously adjusts the RU VCXO to keep the average frequency difference at zero.

4. Fine Time Alignment. This aligns the waveform with the RU receive gate to within the final required accuracy.

4.1.2.3 Processing Description

A high level block diagram of the processing steps is given in FIG. 4.1 FIG. 4.1 shows the methods used to accomplish the objective of each processing step. Except for the frequency tracking stage, matched filtering constitutes the primary tool for time and frequency acquisition. Realization of the matched filter differs in each step, but the concept is identical. Coarse time alignment uses a filter impulse response that is matched to the frequency-offset waveform. Coarse frequency alignment uses a bank of filters to estimate the frequency offset. The final time alignment step uses a single filter that is tuned to the exact specified frequency.

4.2 Delay Compensation

When a RU is installed, it needs to know when to transmit its signals in relation to the signals received from the Base station so that its signal will arrive at the base station at the same time as the signals from the other RUs. The Base station measures the difference between the expected time of arrival and the actual time of arrival of the RU signals. It then transmits this measurement information to the RU so it can advance or delay the time that it sends signals to the Base station.

FIG. 4.2 shows the signals that appear at the Base station. The Base station expects to see the signals from the RU arrive 55 us after it transmits its last burst. FIG. 4.3 shows the signals that appear at the Base and the RU. Before the RU is compensated, the signals it transmits arrive at the Base at a different time to the signals transmitted by the other RUs. The Base measures the delay and transmits the measurement to the RU. The RU then adjusts the time of transmission to compensate for the delay.

Delay compensation can be performed upon installation and also at every call setup. The Delay Compensation calculation routine examines the average signal power in the signals used for the delay calculations and if they are above a certain threshold then a delay compensation measurement is made. FIG. 4.3 shows the Delay Compensation in action.

4.2.1 Algorithm Description

Delay compensation relies on measuring the phase of pilot tones called delay compensation pilots (DCPs). The RU transmits the DCPs to the base station with each DCP having the same phase shift. If the RU has been compensated properly the DCP tones arrive at the base station in phase with each other. If the signal from the RU is delayed then each of the DCP tones experiences a phase shift, which is proportional to the DCP frequency. The Base measures the phase of each DCP and uses linear regression to fit the phases to a straight line. The slope of this line is proportional to the delay. A slope of zero indicates that no delay compensation is needed, whereas a nonzero slope means that the signal is arriving too early (or late) and the RU needs to delay (or advance) transmission of its signal.

Multipath effects and noise will corrupt the phase measurements. This can be mitigated by averaging the phase measurements over frequency (over DCPs) and over time (over successive data bursts).

Section 5 Diversity

Introduction

Diversity is a communication receiver technique that exploits the random nature of radio propagation by finding highly uncorrelated signal paths for communication. Diversity decisions are made by the receiver. If one radio path undergoes a deep fade, another independent path may have a strong signal. By having more than one path to select from, both the instantaneous and average signal to noise ratios at the receiver may be improved.

In Space diversity, multiple base station or remote station receiving antennas are used to provide diversity reception.

In polarization diversity, horizontal and vertical polarization paths between a remote station and a base station are uncorrelated. The decorrelation for the signals in each polarization is caused by multiple reflections in the channel between the remote station antennas. Depending on the characteristics of the link between a given remote and its base station.

Frequency diversity transmits information on more than one carrier frequency.

Time diversity repeatedly transmits information at time spacings that exceed the coherence time of the channel, so that multiple repetitions of the signal will be received with independent fading conditions.

There are four categories of diversity reception methods:
1. Selection diversity
2. Feedback diversity
3. Maximal ratio combining
4. Equal gain diversity In Selection diversity m demodulators are used to provide m diversity branches. The receiver branch having the highest instantaneous SNR is connected to the demodulator.

In Feedback or Scanning Diversity, the m signals are scanned in a fixed sequence until one is found to be above a predetermined threshold.

In Maximal Ratio Combining, the signals from all of the m branches are weighted according to their individual signal voltage to noise power rations and then summed.

In Equal Gain Combining, the branch weights are all set to unity but the signals from each branch are co-phased to provide equal gain combining diversity.

Although frequency diversity is used to mitigate fading, it is not the sole means. In an FDD-based system in which the coherence bandwidth may exceed the available bandwidth, the effectiveness of frequency diversity is not sufficient to avoid fading. Receiving on orthogonal polarization components is used as a complementary means to combat fading. Polarization diversity is used in the PWAN system.

5.1 Frequency Diversity

The maximum frequency separation possible in an 8×2 (spatial×frequency) implementation for the 5 MHZ band is 2.5 MHZ. The frequency separation must exceed the channel coherence bandwidth to minimize the likelihood that both carriers are simultaneously faded. The coherence bandwidths corresponding to correlations of 90% and 50% between frequencies are typically used for roughly characterizing the channel. An estimate of the coherence bandwidth at the 0.90 correlation level is given by Eq:

$$B_c \approx \frac{1}{50\sigma_\tau}$$

where is the rms delay spread. When the coherence bandwidth is defined for 0.50 correlation between frequency components, becomes $$B_c \approx \frac{1}{5\sigma_\tau}$$

Table 5.1 lists as a function of correlation level and upper and lower bounds on rms delay spreads measured at PCS bands including both line of sight and non-line of sight paths.

At the 50% correlation level, the upper bound of exceeds the 2.5 MHZ frequency spacing available for frequency diversity in the PWAN FDD system. The data presented here is not intended as the definitive measure of the coherence bandwidths expected in the PWAN deployment. Rather, it is intended to show that given the uncertainties in the environment, the coherence bandwidth can easily exceed the available system bandwidth for frequency diversity. Given this, another mechanism, such as polarization, must be considered for diversity.

5.2 Polarization Diversity 5.2.1 Introduction

Polarization diversity exploits the tendency of multipath to spill energy from a transmitted polarization component into the orthogonal polarization component. For example, a transmitter may emit a vertically polarized component, but the receiver would receive energy in both the vertical and horizontal polarization components. If fading affects one component and not the other, then the signal could still be received in a polarization diverse system.

5.2.2 Results

Polarization diversity for 900 MHZ and 1800 MHZ systems can provide a diversity gain comparable to horizontal spatial diversity gain. Polarization diversity is used in conjunction with or in lieu of frequency diversity. Some conclusions are:

The correlation between fading of the horizontal and vertical polarization components in multipath is significantly less than 0.70 95% of the time. Correlation values are less than 0.10

Polarization diversity receive systems can provide performance improvement over a single linear polarization channel in a strong multipath environment. The performance is comparable with that provided by a horizontal spatial diversity system.

Diversity performance is enhanced when the transmitting antenna strongly excites a horizontal component in addition to the vertical component. This occurs with a slant 45 degree linear polarization or circular polarization. In this case, the average received signal experiences a loss of less than 1 dB compared with the spatial diversity system.

Maximal ratio combining of the polarization branches is generally assumed in the papers. This provides the best performance compared to selection diversity and equal gain combining. Compared with selection diversity, maximal ratio combining can provide as much as a 3 dB gain benefit in mitigating multipath effects.

In a multipath environment, the typical cross-polarization level is about −10 dB relative to the polarization level of the transmitting antenna.

5.3 The Polarization Diverse System

The orthogonal polarization components may be sufficiently decorrelated to provide protection against multipath fading. (However, the high degree of cross-polarization that makes diversity possible works against polarization as an interference suppression mechanism.) The implementation scenario for polarization diversity in the PWAN system is the following:

Polarization diversity reception at both the Base and RU

Transmitting with either a slant −45 degree linear polarization, or with circular polarization Receiving with either a dual slant 45 degree linear polarization, or with vertical (V) and horizontal (H) components Combining the polarization branches with either maximal ratio combining or equal gain combining. A trade-off between the optimality of the maximal ratio combining and the implementational ease of equal gain combining will determine the best solution.

The resulting invention makes highly efficient use of scarce bandwidth resources to provide good service to a large population of users.

Although the preferred embodiments of the invention have been described in detail above, it will be apparent to those of ordinary skill in the art that obvious modifications may be made to the invention without departing from its spirit or essence. Consequently, the preceding description should be taken as illustrative and not restrictive, and the scope of the invention should be determined in view of the following claims.

TABLE 1.1

The mapping of tones to the ith Forward Physical Channel

| Tone index | Tone | Tone index | Tone |
|---|---|---|---|
| $FPC_i(0)$ | $T_{20i+1}$ | $FPC_i(9)$ | $T_{20i+11}$ |
| $FPC_i(1)$ | $T_{20i+2}$ | $FPC_i(10)$ | $T_{20i+12}$ |
| $FPC_i(2)$ | $T_{20i+3}$ | $FPC_i(11)$ | $T_{20i+13}$ |
| $FPC_i(3)$ | $T_{20i+4}$ | $FPC_i(12)$ | $T_{20i+14}$ |
| $FPC_i(4)$ | $T_{20i+5}$ | $FPC_i(13)$ | $T_{20i+15}$ |
| $FPC_i(5)$ | $T_{20i+6}$ | $FPC_i(14)$ | $T_{20i+16}$ |
| $FPC_i(6)$ | $T_{20i+7}$ | $FPC_i(15)$ | $T_{20i+17}$ |
| $FPC_i(7)$ | $T_{20i+8}$ | $FPC_i(16)$ | $T_{20i+18}$ |
| $FPC_i(8)$ | $T_{20i+9}$ | $FPC_i(17)$ | $T_{20i+19}$ |

TABLE 1.2

The mapping of tones to the ith Reverse Physical Channel

| Tone index | Tone | Tone index | Tone |
|---|---|---|---|
| $RPC_i(0)$ | $T_{20i+1601}$ | $RPC_i(9)$ | $T_{20i+1611}$ |
| $RPC_i(1)$ | $T_{20i+1602}$ | $RPC_i(10)$ | $T_{20i+1612}$ |
| $RPC_i(2)$ | $T_{20i+1603}$ | $RPC_i(11)$ | $T_{20i+1613}$ |
| $RPC_i(3)$ | $T_{20i+1604}$ | $RPC_i(12)$ | $T_{20i+1614}$ |
| $RPC_i(4)$ | $T_{20i+1605}$ | $RPC_i(13)$ | $T_{20i+1615}$ |
| $RPC_i(5)$ | $T_{20i+1606}$ | $RPC_i(14)$ | $T_{20i+1616}$ |
| $RPC_i(6)$ | $T_{20i+1607}$ | $RPC_i(15)$ | $T_{20i+1617}$ |
| $RPC_i(7)$ | $T_{20i+1608}$ | $RPC_i(16)$ | $T_{20i+1618}$ |
| $RPC_i(8)$ | $T_{20i+1609}$ | $RPC_i(17)$ | $T_{20i+1619}$ |

Table 1.3 shows the values of the TDMA slot parameters.

TABLE 1.3

Values of TDMA Slot Parameters.

| TDD Parameter | Value (µs) |
|---|---|
| $T_{slot}$ | 375 |
| $T_{burst}$ | 320 |
| $T_{guard}$ | 55 |

TABLE 1.4

Mapping of symbols onto tones for CLC/BRC transmissions on the ith physical channel

| | slot 0 | slot 1 | slot 2 | slot 3 | slot 4 | slot 5 | slot 6 | slot 7 |
|---|---|---|---|---|---|---|---|---|
| $FPC_i(0)$ | $P_0$ | $P_3$ | $P_6$ | $P_9$ | $P_{12}$ | $P_{15}$ | $P_{18}$ | $P_{21}$ |
| $FPC_i(1)$ | $S_0$ | $S_{15}$ | $S_{30}$ | $S_{45}$ | $S_{60}$ | $S_{75}$ | $S_{90}$ | $S_{105}$ |
| $FPC_i(2)$ | $S_1$ | $S_{16}$ | $S_{31}$ | $S_{46}$ | $S_{61}$ | $S_{76}$ | $S_{91}$ | $S_{106}$ |
| $FPC_i(3)$ | $S_2$ | $S_{17}$ | $S_{32}$ | $S_{47}$ | $S_{62}$ | $S_{77}$ | $S_{92}$ | $S_{107}$ |
| $FPC_i(4)$ | $S_3$ | $S_{18}$ | $S_{33}$ | $S_{48}$ | $S_{63}$ | $S_{78}$ | $S_{93}$ | $S_{108}$ |
| $FPC_i(5)$ | $S_4$ | $S_{19}$ | $S_{34}$ | $S_{49}$ | $S_{64}$ | $S_{79}$ | $S_{94}$ | $S_{109}$ |
| $FPC_i(6)$ | $P_1$ | $P_4$ | $P_7$ | $P_{10}$ | $P_{13}$ | $P_{16}$ | $P_{19}$ | $P_{22}$ |
| $FPC_i(7)$ | $S_5$ | $S_{20}$ | $S_{35}$ | $S_{50}$ | $S_{65}$ | $S_{80}$ | $S_{95}$ | $S_{110}$ |
| $FPC_i(8)$ | $S_6$ | $S_{21}$ | $S_{36}$ | $S_{51}$ | $S_{66}$ | $S_{81}$ | $S_{96}$ | $S_{111}$ |
| $FPC_i(9)$ | $S_7$ | $S_{22}$ | $S_{37}$ | $S_{52}$ | $S_{67}$ | $S_{82}$ | $S_{97}$ | $S_{112}$ |
| $FPC_i(10)$ | $S_8$ | $S_{23}$ | $S_{38}$ | $S_{53}$ | $S_{68}$ | $S_{83}$ | $S_{98}$ | $S_{113}$ |
| $FPC_i(11)$ | $S_9$ | $S_{24}$ | $S_{39}$ | $S_{54}$ | $S_{69}$ | $S_{84}$ | $S_{99}$ | $S_{114}$ |
| $FPC_i(12)$ | $P_2$ | $P_5$ | $P_8$ | $P_{11}$ | $P_{14}$ | $P_{17}$ | $P_{20}$ | $P_{23}$ |
| $FPC_i(13)$ | $S_{10}$ | $S_{25}$ | $S_{40}$ | $S_{55}$ | $S_{70}$ | $S_{85}$ | $S_{100}$ | $S_{115}$ |
| $FPC_i(14)$ | $S_{11}$ | $S_{26}$ | $S_{41}$ | $S_{56}$ | $S_{71}$ | $S_{86}$ | $S_{101}$ | $S_{116}$ |
| $FPC_i(15)$ | $S_{12}$ | $S_{27}$ | $S_{42}$ | $S_{57}$ | $S_{72}$ | $S_{87}$ | $S_{102}$ | $S_{117}$ |
| $FPC_i(16)$ | $S_{13}$ | $S_{28}$ | $S_{43}$ | $S_{58}$ | $S_{73}$ | $S_{88}$ | $S_{103}$ | $S_{118}$ |
| $FPC_i(17)$ | $S_{14}$ | $S_{29}$ | $S_{44}$ | $S_{59}$ | $S_{74}$ | $S_{89}$ | $S_{104}$ | $S_{119}$ |

TABLE 1.5

Mapping of symbols onto tones for CAC transmissions on the ith reverse physical channel

| | slot 0 | slot 1 | slot 2 | slot 3 | slot 4 | slot 5 | slot 6 | slot 7 |
|---|---|---|---|---|---|---|---|---|
| $RPC_i(0)$ | $P_0$ | $P_9$ | $P_{18}$ | $P_{27}$ | $P_{36}$ | $P_{45}$ | $P_{54}$ | $P_{63}$ |
| $RPC_i(1)$ | $S_0$ | $S_9$ | $S_{18}$ | $S_{27}$ | $S_{36}$ | $S_{45}$ | $S_{54}$ | $S_{63}$ |
| $RPC_i(2)$ | $P_1$ | $P_{10}$ | $P_{19}$ | $P_{28}$ | $P_{37}$ | $P_{46}$ | $P_{55}$ | $P_{64}$ |
| $RPC_i(3)$ | $S_1$ | $S_{10}$ | $S_{19}$ | $S_{28}$ | $S_{37}$ | $S_{46}$ | $S_{55}$ | $S_{64}$ |
| $RPC_i(4)$ | $P_2$ | $P_{11}$ | $P_{20}$ | $P_{29}$ | $P_{38}$ | $P_{47}$ | $P_{56}$ | $P_{65}$ |
| $RPC_i(5)$ | $S_2$ | $S_{11}$ | $S_{20}$ | $S_{29}$ | $S_{38}$ | $S_{47}$ | $S_{56}$ | $S_{65}$ |
| $RPC_i(6)$ | $P_3$ | $P_{12}$ | $P_{21}$ | $P_{30}$ | $P_{39}$ | $P_{48}$ | $P_{57}$ | $P_{66}$ |
| $RPC_i(7)$ | $S_3$ | $S_{12}$ | $S_{21}$ | $S_{30}$ | $S_{39}$ | $S_{48}$ | $S_{57}$ | $S_{66}$ |
| $RPC_i(8)$ | $P_4$ | $P_{13}$ | $P_{22}$ | $P_{31}$ | $P_{40}$ | $P_{49}$ | $P_{58}$ | $P_{67}$ |
| $RPC_i(9)$ | $S_4$ | $S_{13}$ | $S_{22}$ | $S_{31}$ | $S_{40}$ | $S_{49}$ | $S_{58}$ | $S_{67}$ |
| $RPC_i(10)$ | $P_5$ | $P_{14}$ | $P_{23}$ | $P_{32}$ | $P_{41}$ | $P_{50}$ | $P_{59}$ | $P_{68}$ |
| $RPC_i(11)$ | $S_5$ | $S_{14}$ | $S_{23}$ | $S_{32}$ | $S_{41}$ | $S_{50}$ | $S_{59}$ | $S_{68}$ |
| $RPC_i(12)$ | $P_6$ | $P_{15}$ | $P_{24}$ | $P_{33}$ | $P_{42}$ | $P_{51}$ | $P_{60}$ | $P_{69}$ |
| $RPC_i(13)$ | $S_6$ | $S_{15}$ | $S_{24}$ | $S_{33}$ | $S_{42}$ | $S_{51}$ | $S_{60}$ | $S_{69}$ |
| $RPC_i(14)$ | $P_7$ | $P_{16}$ | $P_{25}$ | $P_{34}$ | $P_{43}$ | $P_{52}$ | $P_{61}$ | $P_{70}$ |
| $RPC_i(15)$ | $S_7$ | $S_{16}$ | $S_{25}$ | $S_{34}$ | $S_{43}$ | $S_{52}$ | $S_{61}$ | $S_{70}$ |
| $RPC_i(16)$ | $P_8$ | $P_{17}$ | $P_{26}$ | $P_{35}$ | $P_{44}$ | $P_{53}$ | $P_{62}$ | $P_{71}$ |
| $RPC_i(17)$ | $S_8$ | $S_{17}$ | $S_{26}$ | $S_{35}$ | $S_{44}$ | $S_{53}$ | $S_{62}$ | $S_{71}$ |

TABLE 3.1

Measurements and interpretations

| RSSI Status | SINR Status | Interpretation |
|---|---|---|
| low | low | Good candidate channel - little activity |
| low | high | Unlikely situation - need quantification |
| high | low | Bad candidate channel |
| high | high | Could be OK |

TABLE 5.1

Coherence Bandwidths at 0.90 and 0.50 Correlation

| $\sigma_\tau$(usec) | 0.90 Correlation | 0.50 Correlation |
|---|---|---|
| 0.025 | 800 kHz | 8 MHz |
| 0.200 | 100 kHz | 1 MHz |

What is claimed is:

1. A system for highly bandwidth-efficient communications, comprising:

a base station receiver for receiving multiple incoming wireless signals from multiple remote stations, wherein the incoming wireless signals comprise multiple discrete frequency tones that are orthogonal frequency division multiplexed (OFDM) in a first frequency band during multiple time division multiple access (TDMA) intervals, and wherein the multiple remote stations transmitting to the base station receiver are not always identical in successive TDMA intervals; and a base station transmitter for transmitting multiple outgoing wireless signals to multiple remote stations, wherein the outgoing wireless signals comprise multiple discrete frequency tones that are orthogonal frequency division multiplexed (OFDM) in a second frequency band during multiple time division multiple access (TDMA) intervals, and wherein the multiple remote stations intended to receive the outgoing wireless signals from the base station receiver is not always identical in successive TDMA intervals.

2. An apparatus for wireless communications, comprising:

a remote station, wherein multiple remote stations transmit multiple outgoing wireless signals to a base station receiver, wherein the outgoing wireless signals comprise multiple discrete frequency tones that are orthogonal frequency division multiplexed (OFDM) in a first frequency band during multiple time division multiple access (TDMA) intervals, and wherein the multiple remote stations transmitting to the base station receiver is not always identical in successive TDMA intervals; and the remote station, wherein the multiple remote stations receive multiple incoming wireless signals from a base station transmitter, said incoming wireless signals comprising multiple discrete frequency tones that are orthogonal frequency division multiplexed (OFDM) in a second frequency band during multiple time division multiple access (TDM) intervals, wherein the multiple remote stations intended to receive the outgoing wireless signals from said base station receiver are not always identical in successive TDMA intervals.

3. The apparatus of claim 2, wherein the remote station is a mobile wireless handset.

4. In a communications system based at least in part on orthogonal frequency division multiplexing (OFDM), a method for communicating between a base station and a remote station, the method comprising:

establishing a traffic channel from the base station to the remote station; and based on a waveform transmitted from the base station to the remote station, synchronizing operations at the base station and the remote station, wherein the waveform comprises multiple discrete frequency tones that are orthogonal frequency division multiplexed, and wherein the synchronization includes aligning a processing window with the transmitted waveform and adjusting a reference oscillator at the remote station to operate at the same frequency as an oscillator at the base station.

5. In a communications system, a method for communicating between a base station and a remote station, the method comprising:

receiving information associated with the remote station wherein the information includes a direction of arrival (DOA) for the remote station and channel measurements for multiple channels;

computing a channel candidacy assessment factor (CAF) for each of the multiple channels based on the received information; and where the channel candidacy assessment factor (CAF) for at least one of the multiple channels is acceptable, selecting the channel with the most favorable CAF.

6. The method of claim 5, wherein each channel measurement comprises a received signal strength indicator (RSSI) and a signal to interference ratio (SINR).

* * * * *

UNITED STATES PATENT AND TRADEMARK OFFICE
CERTIFICATE OF CORRECTION

PATENT NO. : 6,853,629 B2
DATED : February 8, 2005
INVENTOR(S) : Siavash Alamouti et al.

It is certified that error appears in the above-identified patent and that said Letters Patent is hereby corrected as shown below:

Column 20,
Line 44, "statistically" should be -- stationarity --;

Column 22,
Line 2, "stationary" should be -- stationarity --;

Column 26,
Line 55, "fine" should be -- line --;

Signed and Sealed this

Seventh Day of June, 2005

JON W. DUDAS
*Director of the United States Patent and Trademark Office*